US008262451B2

(12) United States Patent
Powell et al.

(10) Patent No.: US 8,262,451 B2

(45) Date of Patent: Sep. 11, 2012

(54) BINGO SYSTEM WITH DISCRETE PAYOUT CATEGORIES

(75) Inventors: Tracy Powell, Reno, NV (US); Justin M. Krum, Reno, NV (US); Bryan D. Wolf, Reno, NV (US)

(73) Assignee: IGT, Reno, NV (US)

( * ) Notice: Subject to any disclaimer, the term of this patent is extended or adjusted under 35 U.S.C. 154(b) by 1818 days.

(21) Appl. No.: 11/442,029

(22) Filed: May 26, 2006

(65) Prior Publication Data

US 2007/0155473 A1 Jul. 5, 2007

Related U.S. Application Data

(60) Provisional application No. 60/752,014, filed on Dec. 19, 2005.

(51) Int. Cl.

*A63F 9/24* (2006.01)
*A63F 13/00* (2006.01)
*G06F 17/00* (2006.01)

(52) U.S. Cl. ........................................................ 463/16

(58) Field of Classification Search .................... 463/16, 463/17, 19

See application file for complete search history.

(56) References Cited

U.S. PATENT DOCUMENTS

| | | | |
|---|---|---|---|
| 3,671,041 | A | 6/1972 | Taylor et al. |
| 4,332,389 | A | 6/1982 | Loyd, Jr. et al. |
| 4,365,810 | A | 12/1982 | Richardson |
| 4,373,726 | A | 2/1983 | Churchill et al. |
| 4,455,025 | A | 6/1984 | Itkis |
| 4,624,462 | A | 11/1986 | Itkis |
| 4,798,387 | A | 1/1989 | Richardson |
| 4,848,771 | A | 7/1989 | Richardson |
| 4,856,787 | A | 8/1989 | Itkis |
| 5,007,649 | A | 4/1991 | Richardson |
| 5,092,598 | A | 3/1992 | Kamille |
| 5,192,076 | A | 3/1993 | Komori |
| 5,242,163 | A | 9/1993 | Fulton |

(Continued)

FOREIGN PATENT DOCUMENTS

WO 01/99067 12/2001

(Continued)

OTHER PUBLICATIONS

PCT patent application No. PCT/US2006/048064, International Search Report and Written Opinion dated Jul. 5, 2007.

(Continued)

*Primary Examiner* — David L Lewis
*Assistant Examiner* — Reginald Renwick
(74) *Attorney, Agent, or Firm* — Weaver Austin Villeneuve & Sampson LLP

(57) ABSTRACT

Novel methods, devices and systems are described for mapping pay amounts for a variety of Class III game themes to a common set of bingo pay amounts. Each Class III game theme may cause a different type of entertaining display on a gaming machine when bingo is played, based upon a corresponding Class III game. Preferably, each Class III game theme will offer game play and paytable percentages closely matching those of the original Class III game. Some implementations allow flexibility in matching the probabilities of bingo outcomes and Class III game outcomes by mapping ranges of Class III pay amounts to a single bingo pay amount. Some implementations provide a system wherein electronic gaming machines presenting entertaining displays of various Class III game themes are linked to a single bingo server.

20 Claims, 25 Drawing Sheets

U.S. PATENT DOCUMENTS

| | | | | |
|---|---|---|---|---|
| 5,297,802 | A | 3/1994 | Pocock et al. | |
| 5,351,970 | A | 10/1994 | Fioretti | |
| 5,393,057 | A | 2/1995 | Marnell, II | |
| 5,407,199 | A | 4/1995 | Gumina | |
| 5,611,729 | A * | 3/1997 | Schumacher et al. | 463/18 |
| 5,639,088 | A | 6/1997 | Schneider et al. | |
| 5,833,540 | A | 11/1998 | Miodunski et al. | |
| 5,967,895 | A | 10/1999 | Kellen | |
| 6,012,984 | A | 1/2000 | Roseman | |
| 6,089,978 | A | 7/2000 | Adams | |
| 6,093,100 | A | 7/2000 | Singer et al. | |
| 6,149,156 | A | 11/2000 | Feola | |
| 6,159,095 | A | 12/2000 | Frohm et al. | |
| 6,168,521 | B1 | 1/2001 | Luciano et al. | |
| 6,183,361 | B1 | 2/2001 | Cummings et al. | |
| 6,280,325 | B1 | 8/2001 | Fisk | |
| 6,524,185 | B2 | 2/2003 | Lind | |
| 6,537,150 | B1 | 3/2003 | Luciano | |
| 6,569,017 | B2 | 5/2003 | Enzminger et al. | |
| 6,656,040 | B1 | 12/2003 | Brosnan et al. | |
| 6,656,044 | B1 | 12/2003 | Lewis | |
| 6,802,776 | B2 | 10/2004 | Lind et al. | |
| 6,840,858 | B2 | 1/2005 | Adams | |
| 7,241,221 | B1 | 7/2007 | Luciano et al. | |
| 7,614,948 | B2 | 11/2009 | Saffari et al. | |
| 7,708,633 | B2 | 5/2010 | Lind et al. | |
| 7,753,774 | B2 | 7/2010 | Gail et al. | |
| 7,798,898 | B2 | 9/2010 | Luciano et al. | |
| 8,070,579 | B2 | 12/2011 | Bienvenue et al. | |
| 2002/0013170 | A1 | 1/2002 | Miller et al. | |
| 2002/0113369 | A1 | 8/2002 | Weingardt | |
| 2002/0132661 | A1 | 9/2002 | Lind et al. | |
| 2003/0125101 | A1 | 7/2003 | Campo | |
| 2003/0130029 | A1* | 7/2003 | Crumby | 463/20 |
| 2004/0072619 | A1 | 4/2004 | Brosnan et al. | |
| 2004/0077402 | A1 | 4/2004 | Schlottmann | |
| 2004/0152508 | A1* | 8/2004 | Lind et al. | 463/19 |
| 2005/0014553 | A1 | 1/2005 | Byrne | |
| 2005/0096120 | A1 | 5/2005 | Lind et al. | |
| 2005/0130730 | A1* | 6/2005 | Lind et al. | 463/19 |
| 2005/0233798 | A1 | 10/2005 | Van Asdale | |
| 2005/0233799 | A1 | 10/2005 | LeMay | |
| 2006/0025197 | A1 | 2/2006 | Kane et al. | |
| 2006/0025199 | A1 | 2/2006 | Harkins et al. | |
| 2006/0082056 | A1 | 4/2006 | Kane et al. | |
| 2006/0287058 | A1 | 12/2006 | Resnick et al. | |
| 2007/0155471 | A1 | 7/2007 | Powell et al. | |
| 2007/0155472 | A1 | 7/2007 | Gail et al. | |
| 2007/0161423 | A1 | 7/2007 | Bienvenue et al. | |
| 2007/0173313 | A1 | 7/2007 | Bienvenue et al. | |
| 2012/0040733 | A1 | 2/2012 | Bienvenue et al. | |

FOREIGN PATENT DOCUMENTS

| | | |
|---|---|---|
| WO | WO 01/99067 | 12/2001 |
| WO | WO 03/085613 | 10/2003 |
| WO | 2004/095383 A1 | 4/2004 |
| WO | WO 2006/039324 | 4/2006 |
| WO | WO 2007/075401 | 7/2007 |
| WO | WO 2007/075486 | 7/2007 |
| WO | WO 2007/075582 | 7/2007 |
| WO | WO 2007/078828 | 7/2007 |
| WO | WO 2008/005278 | 1/2008 |

OTHER PUBLICATIONS

International Search Report, mailed Aug. 8, 2007 from International Application No. PCT/US2006/047887, 5 pp. including Notification of Transmittal.
Written Opinion of the International Searching Authority, mailed Aug. 8, 2007 from International Application No. PCT/US2006/047887, 7 pp.
International Search Report of the International Searching Authority, mailed Jul. 4, 2007 from International Application No. PCT/US2006/047714, 5 pp including Notification of Transmittal.
Written Opinion of the International Searching Authority, mailed Jul. 4, 2007 from International Application No. PCT/US2006/047714, 6 pp including Notification of Transmittal.
Bienvenue et al., U.S. Appl. No. 11/312,966, "Bingo System With Downloadable Common Patterns", filed Dec. 19, 2005.
Powell et al., U.S. Appl. No. 11/312,948, "Bingo Gaming Machine Capable of Selecting Different Bingo Pools", filed Dec. 19, 2005.
Gail et al., U.S. Appl. No. 11/402,726, "Using Multiple Bingo Cards to Represent Multiple Slot Paylines and Other Class III Game Options", filed Apr. 11, 2006.
International Search Report, mailed Jul. 6, 2007 from International Application No. PCT/US2006/048264, 5 pp including Notification of Transmittal.
Written Opinion of the International Searching Authority, mailed Jul. 6, 2007 from International Application No. PCT/US2006/048264, 7 pp.
US Office Action dated Sep. 28, 2010 issued in U.S. Appl. No. 11/312,966.
US Office Action dated Mar. 17, 2011 issued in U.S. Appl. No. 11/312,966.
US Examiner Interview Summary dated May 31, 2011 issued in U.S. Appl. No. 11/312,966.
US Notice of Allowance dated Jul. 28, 2011 issued in U.S. Appl. No. 11/312,966.
US Office Action dated Oct. 7, 2010 issued in U.S. Appl. No. 11/312,948.
US Office Action Final dated Apr. 1, 2011 issued in U.S. Appl. No. 11/312,948.
US Office Action dated Nov. 25, 2008 issued in U.S. Appl. No. 11/402,726.
US Final Office Action dated Jul. 1, 2009 issued in U.S. Appl. No. 11/402,726.
US Notice of Allowance and Examiner Interview Summary dated Mar. 1, 2010 issued in U.S. Appl. No. 11/402,726.
US Notice of Allowance and Supplemental Notice of Allowability dated Jun. 3, 2010 issued in U.S. Appl. No. 11/402,726.
PCT International Preliminary Report on Patentability and Written Opinion dated Jun. 24, 2008 issued in WO 2007/075401 (PCT/US2006/047887).
Chinese First Office Action dated Jan. 22, 2010 issued in CN 200680052457.0.
Mexican Office Action dated Nov. 14, 2011 issued in MX 08/07952.
PCT International Preliminary Report on Patentability and Written Opinion dated Jun. 24, 2008 issued in WO 2007/075486 (PCT/US2006/048064).
Chinese First Office Action dated Jan. 29, 2010 issued in CN 200680052896.1.
Mexican Office Action dated Aug. 19, 2011 issued in MX 08/07951.
PCT International Preliminary Report on Patentability and Written Opinion dated Jun. 24, 2008 issued in WO2007/078828 (PCT/US2006/047714).
Chinese First Office Action dated Jan. 22, 2010 issued in CN 200680052834.0.
Mexican Office Action dated Nov. 14, 2011 issued in MX 08/07953.
PCT International Preliminary Report on Patentability and Written Opinion dated Jun. 24, 2008 issued in WO2007/075582 (PCT/US2006/048264).
Chinese First Office Action dated Feb. 12, 2010 issued in CN 200680051371.6.0.
Mexican Office Action dated Oct. 27, 2011 issued in MX 08/07954.
"Improving your Bingo odds", (2002-2005) *10 Best Bingo Sites*, [downloaded on Dec. 13, 2010 at http://web.archive.org/web/20050629010907/http://10bestbingosites.com/bingo_odds.php].

* cited by examiner

100

| Outcome (105) | Weight (110) | Draw (115) |
|---|---|---|
| A | 12 | 0-11 |
| B | 15 | 12-26 |
| C | 4 | 27-30 |
| D | 25 | 31-55 |
| | Total = 56 | |

*Fig. 1*

200

| Bingo Payout (205) | Probability (210) | Class III Payout (215) | Weight (220) | Probability (225) |
|---|---|---|---|---|
| 3 | 0.100 | 3 | 1.00 | 0.1000 |
| 4 | 0.080 | 4 | 1.00 | 0.0800 |
| 5 | 0.050 | 5 | 1.00 | 0.0500 |
| 10 | 0.040 | 6 | 0.40 | 0.0160 |
| | | 7 | 0.30 | 0.0120 |
| | | 8 | 0.20 | 0.0080 |
| | | 9 | 0.08 | 0.0032 |
| | | 10 | 0.02 | 0.0008 |
| 15 | 0.030 | 10 | 0.24 | 0.0072 |
| | | 12 | 0.50 | 0.0150 |
| | | 14 | 0.26 | 0.0078 |

*Fig. 2*

*Fig. 3A*

300

| Payout (305) | Probability (310) | Payback Percentage (315) |
|---|---|---|
| 1000 | 0.0000200 | 2.000% |
| 100 | 0.0001000 | 1.000% |
| 50 | 0.0001000 | 0.500% |
| 40 | 0.0005000 | 2.000% |
| 20 | 0.0060000 | 12.000% |
| 15 | 0.0070000 | 10.500% |
| 10 | 0.0080000 | 8.000% |
| 5 | 0.0100000 | 5.000% |
| 4 | 0.0300000 | 12.000% |
| 3 | 0.0500000 | 15.000% |
| 2 | 0.0700000 | 14.000% |
| 1 | 0.0900000 | 9.000% |
| Total (320) | 0.2717200 | 91.000% |

Class II Paytable

*Fig. 3B*

350

| Payout (355) | Probability (360) | Payback Percentage (365) |
|---|---|---|
| 800 | 0.0000249 | 1.992% |
| 80 | 0.0001958 | 1.566% |
| 50 | 0.0001068 | 0.534% |
| 40 | 0.0005273 | 2.109% |
| 25 | 0.0016399 | 4.100% |
| 8 | 0.0115143 | 9.211% |
| 5 | 0.01088 | 5.440% |
| 4 | 0.0112213 | 4.489% |
| 3 | 0.0744682 | 22.340% |
| 2 | 0.1293079 | 25.862% |
| 1 | 0.2152592 | 21.526% |
| Total (370) | 0.4551456 | 99.169% |

Class III Paytable

500

505 510 515 525 530 542 535 540

| | | | | | | | | | | | | | | | | |
|---|---|---|---|---|---|---|---|---|---|---|---|---|---|---|---|---|
| | | | Class II | Paytable | | | | | | | | | | | | |
| | | Payout | 1 | 2 | 3 | 4 | 5 | 10 | 15 | 20 | 40 | 50 | 100 | 1,000 | Total | |
| | Payout | Probabilty | 0.0900000 | 0.0700000 | 0.0300000 | 0.0500000 | 0.0100000 | 0.0080000 | 0.0070000 | 0.0060000 | 0.0005000 | 0.0001000 | 0.0001000 | 0.0000200 | 0.2717200 | |
| Class III | 1 | 0.2152592 | | | | | | | | | | | | | 0.0000000 | Final Class III |
| Paytable | 2 | 0.1293079 | | | | | | | | | | | | | 0.0000000 | Probability |
| | 3 | 0.0744682 | | | | | | | | | | | | | 0.0000000 | |
| | 4 | 0.0112213 | | | | | | | | | | | | | 0.0000000 | |
| | 5 | 0.0108800 | | | | | | | | | | | | | 0.0000000 | |
| | 8 | 0.0115143 | | | | | | | | | | | | | 0.0000000 | |
| | 25 | 0.0016399 | | | | | | | | | | | | | 0.0000000 | |
| | 40 | 0.0005273 | | | | | | | | | | | | | 0.0000000 | |
| | 50 | 0.0001068 | | | | | | | | | | | | | 0.0000000 | |
| | 80 | 0.0001958 | | | | | | | | | | | | | 0.0000000 | |
| | 800 | 0.0000249 | | | | | | | | | | | | | 0.0000000 | |
| | Total | 0.4551456 | | | | | | | | | | | | | | |

520 544

Fig. 5A

500

505 515 530 535

| | | | Class II | Paytable | | | | | | | | | | | | |
|---|---|---|---|---|---|---|---|---|---|---|---|---|---|---|---|---|
| | | Payout | 1 | 2 | 3 | 4 | 5 | 10 | 15 | 20 | 40 | 50 | 100 | 1,000 | Total | |
| | Payout | Probabilty | 0.0900000 | 0.0700000 | 0.0300000 | 0.0500000 | 0.0100000 | 0.0080000 | 0.0070000 | 0.0060000 | 0.0005000 | 0.0001000 | 0.0001000 | 0.0000200 | 0.2717200 | |
| Class III | 1 | 0.1285088 | | | | | | | | | | | | | 0.0000000 | Final Class III |
| Paytable | 2 | 0.0771962 | | | | | | | | | | | | | 0.0000000 | Probability |
| | 3 | 0.0444572 | | | | | | | | | | | | | 0.0000000 | |
| | 4 | 0.0066991 | | | | | | | | | | | | | 0.0000000 | |
| | 5 | 0.0064953 | | | | | | | | | | | | | 0.0000000 | |
| | 8 | 0.0068740 | | | | | | | | | | | | | 0.0000000 | |
| | 25 | 0.0009790 | | | | | | | | | | | | | 0.0000000 | |
| | 40 | 0.0003148 | | | | | | | | | | | | | 0.0000000 | |
| | 50 | 0.0000638 | | | | | | | | | | | | | 0.0000000 | |
| | 80 | 0.0001169 | | | | | | | | | | | | | 0.0000000 | |
| | 800 | 0.0000149 | | | | | | | | | | | | | 0.0000000 | |
| | Total | 0.2717200 | | | | | | | | | | | | | | |

520

*Fig. 5B*

500

| | | | Class II Paytable | | | | | | | | | | | | | |
|---|---|---|---|---|---|---|---|---|---|---|---|---|---|---|---|---|
| | | Payout | 1 | 2 | 3 | 4 | 5 | 10 | 15 | 20 | 40 | 50 | 100 | 1,000 | Total | |
| | Payout | Probabilty | 0.0900000 | 0.0700000 | 0.0300000 | 0.0500000 | 0.0100000 | 0.0080000 | 0.0070000 | 0.0060000 | 0.0005000 | 0.0001000 | 0.0001000 | 0.0000200 | 0.2717200 | |
| Class III | 1 | 0.1285088 | 0.0900000 | 0.0385088 | | | | | | | | | | | 0.1285088 | Final Class III |
| Paytable | 2 | 0.0771962 | | 0.0314912 | 0.0300000 | 0.0157050 | | | | | | | | | 0.0771962 | Probability |
| | 3 | 0.0444572 | | | | 0.0342950 | 0.0100000 | 0.0001622 | | | | | | | 0.0444572 | |
| | 4 | 0.0066991 | | | | | | 0.0066991 | | | | | | | 0.0066991 | |
| | 5 | 0.0064953 | | | | | | 0.0011387 | 0.0053566 | | | | | | 0.0064953 | |
| | 8 | 0.0068740 | | | | | | | 0.0016434 | 0.0052306 | | | | | 0.0068740 | |
| | 25 | 0.0009790 | | | | | | | | 0.0007694 | 0.0002096 | | | | 0.0009790 | |
| | 40 | 0.0003148 | | | | | | | | | 0.0002904 | 0.0000244 | | | 0.0003148 | |
| | 50 | 0.0000638 | | | | | | | | | | 0.0000638 | | | 0.0000638 | |
| | 80 | 0.0001169 | | | | | | | | | | 0.0000118 | 0.0001000 | 0.0000051 | 0.0001169 | |
| | 800 | 0.0000149 | | | | | | | | | | | | 0.0000149 | 0.0000149 | |
| | Total | 0.2717200 | | | | | | | | | | | | | | |

515 520 535 540 542 544 545 546 548 550 552 553 554 555 556 558 560 561 563 565

*Fig. 5C*

| | | | | | | | | | | | | | | | |
|---|---|---|---|---|---|---|---|---|---|---|---|---|---|---|---|
| | | | Class II | Paytable | | | | | | | | | | | |
| | | Payout | 1 | 2 | 3 | 4 | 5 | 10 | 15 | 20 | 40 | 50 | 100 | 1,000 | Total |
| | Payout | Probabilty | 0.0900000 | 0.0700000 | 0.0300000 | 0.0500000 | 0.0100000 | 0.0080000 | 0.0070000 | 0.0060000 | 0.0005000 | 0.0001000 | 0.0001000 | 0.0000200 | 0.2717200 |
| Class III | 1 | 0.1285088 | 0.0900000 | 0.0385088 | | | | | | | | | | | 0.1285088 | Final Class III |
| Paytable | 2 | 0.0771962 | | 0.0314912 | 0.0300000 | 0.0157050 | | | | | | | | | 0.0771962 | Probability |
| | 3 | 0.0444572 | | | | 0.0342950 | 0.0100000 | 0.0001622 | | | | | | | 0.0444572 |
| | 4 | 0.0066991 | | | | | | 0.0066991 | | | | | | | 0.0066991 |
| | 5 | 0.0064953 | | | | | | 0.0011387 | 0.0053566 | | | | | | 0.0064953 |
| | 8 | 0.0068740 | | | | | | | 0.0016434 | 0.0052306 | | | | | 0.0068740 |
| | 25 | 0.0009790 | | | | | | | | | 0.0002096 | | | | 0.0002096 |
| | 40 | 0.0003148 | | | | | | | | | 0.0002904 | 0.0000244 | | | 0.0003148 |
| | 50 | 0.0000638 | | | | | | | | | | 0.0000638 | | | 0.0000638 |
| | 80 | 0.0001169 | | | | | | | | | | | 0.0001000 | 0.0000051 | 0.0001051 |
| | 800 | 0.0000149 | | | | | | | | | | | | 0.0000149 | 0.0000149 |
| | Total | 0.2717200 | | | | | | | | | | | | | |

567 561 569 563 565 545 555 571 573

Fig. 5D

| | | Class II Paytable | | | | | | | | | | | |
|---|---|---|---|---|---|---|---|---|---|---|---|---|---|
| | Payout | 1 | 2 | 3 | 4 | 5 | 10 | 15 | 20 | 40 | 50 | 100 | 1,000 |
| Class III Paytable | 1 | 1.0000000 | 0.5501257 | | | | | | | | | | |
| | 2 | | 0.4498743 | 1.0000000 | 0.3141000 | | | | | | | | |
| | 3 | | | | 0.6859000 | 1.0000000 | 0.0202750 | | | | | | |
| | 4 | | | | | | 0.8373875 | | | | | | |
| | 5 | | | | | | 0.1423375 | 0.7652286 | | | | | |
| | 8 | | | | | | | 0.2347714 | 1.0000000 | | | | |
| | 25 | | | | | | | | | 0.4192000 | | | |
| | 40 | | | | | | | | | 0.5808000 | 0.2766440 | | |
| | 50 | | | | | | | | | | 0.7233560 | | |
| | 80 | | | | | | | | | | | 1.0000000 | 0.2550000 |
| | 800 | | | | | | | | | | | | 0.7450000 |

Fig. 5E

600

| | | | Class II | Paytable | | | | | | | | | | | |
|---|---|---|---|---|---|---|---|---|---|---|---|---|---|---|---|
| | | Payout | 1 | 2 | 3 | 4 | 5 | 10 | 15 | 20 | 40 | 50 | 100 | 1,000 | Total |
| | Payout | Probabilty | 0.3312233 | 0.2576181 | 0.1104078 | 0.1840130 | 0.0368026 | 0.0294421 | 0.0257618 | 0.0220816 | 0.0018401 | 0.0003680 | 0.0003680 | 0.0000736 | 1.0000000 |
| Class III | 1 | 0.4729458 | | | | | | | | | | | | | 0.0000000 |
| Paytable | 2 | 0.2841023 | | | | | | | | | | | | | 0.0000000 |
| | 3 | 0.1636140 | | | | | | | | | | | | | 0.0000000 |
| | 4 | 0.0246543 | | | | | | | | | | | | | 0.0000000 |
| | 5 | 0.0239044 | | | | | | | | | | | | | 0.0000000 |
| | 8 | 0.0252981 | | | | | | | | | | | | | 0.0000000 |
| | 25 | 0.0036030 | | | | | | | | | | | | | 0.0000000 |
| | 40 | 0.0011585 | | | | | | | | | | | | | 0.0000000 |
| | 50 | 0.0002347 | | | | | | | | | | | | | 0.0000000 |
| | 80 | 0.0004302 | | | | | | | | | | | | | 0.0000000 |
| | 800 | 0.0000547 | | | | | | | | | | | | | 0.0000000 |
| | Total | 1.0000000 | | | | | | | | | | | | | |

644

Fig. 6A

600

605 610

| | | | Class II Paytable | | | | | | | | | | | | |
|---|---|---|---|---|---|---|---|---|---|---|---|---|---|---|---|
| | | Payout | 1 | 2 | 3 | 4 | 5 | 10 | 15 | 20 | 40 | 50 | 100 | 1,000 | Total |
| | Payout | Probability | 0.3312233 | 0.2576181 | 0.1104078 | 0.1840130 | 0.0368026 | 0.0294421 | 0.0257618 | 0.0220816 | 0.0018401 | 0.0003680 | 0.0003680 | 0.0000736 | 1.0000000 |
| Class III | 1 | 0.4729458 | 0.3312233 | 0.1417225 | | | | | | | | | | | 0.4729458 |
| Paytable | 2 | 0.2841023 | | 0.1158957 | 0.1104078 | 0.0577988 | | | | | | | | | 0.2841023 |
| | 3 | 0.1636140 | | | | 0.1262141 | 0.0368026 | 0.0005973 | | | | | | | 0.1636140 |
| | 4 | 0.0246543 | | | | | | 0.0246543 | | | | | | | 0.0246543 |
| | 5 | 0.0239044 | | | | | | 0.0041904 | 0.0197140 | | | | | | 0.0239044 |
| | 8 | 0.0252981 | | | | | | | 0.0060478 | 0.0192502 | | | | | 0.0252981 |
| | 25 | 0.0036030 | | | | | | | | | 0.0018401 | 0.0003680 | 0.0003680 | 0.0000736 | 0.0026498 |
| | 40 | 0.0011585 | | | | | | | | | | | | | 0.0000000 |
| | 50 | 0.0002347 | | | | | | | | | | | | | 0.0000000 |
| | 80 | 0.0004302 | | | | | | | | | | | | | 0.0000000 |
| | 800 | 0.0000547 | | | | | | | | | | | | | 0.0000000 |
| | Total | 1.0000000 | | | | | | | | | | | | | |

603

601 640 644 611 615 620 625 630 635

Fig. 6B 1005 1010 1015 1020

| | | | Class II | Paytable | | | | | | | | | | | |
|---|---|---|---|---|---|---|---|---|---|---|---|---|---|---|---|
| | | Payout | 1 | 2 | 3 | 4 | 5 | 10 | 15 | 20 | 40 | 50 | 100 | 1,000 | Total |
| | Payout | Probabilty | 0.0900000 | 0.0700000 | 0.0300000 | 0.0500000 | 0.0100000 | 0.0080000 | 0.0070000 | 0.0060000 | 0.0005000 | 0.0001000 | 0.0001000 | 0.0000200 | 0.2717200 |
| Class III | 1 | 0.2152592 | 2.0000000 | 1.0000000 | | | | | | | | | | | 3.0000000 |
| Paytable | 2 | 0.1293079 | | 2.0000000 | 1.0000000 | 0.5000000 | | | | | | | | | 3.5000000 |
| | 3 | 0.0744682 | | | 2.0000000 | 1.0000000 | 0.5000000 | | | | | | | | 3.5000000 |
| | 4 | 0.0112213 | | | | 2.0000000 | 1.0000000 | | | | | | | | 3.0000000 |
| | 5 | 0.0108800 | | | | | 2.0000000 | 0.2000000 | | | | | | | 2.2000000 |
| | 8 | 0.0115143 | | | | | | 0.5000000 | 0.1428571 | | | | | | 0.6428571 |
| | 25 | 0.0016399 | | | | | | | | | 0.0666667 | 0.0400000 | | | 0.1066667 |
| | 40 | 0.0005273 | | | | | | | | | 2.0000000 | 0.1000000 | | | 2.1000000 |
| | 50 | 0.0001068 | | | | | | | | | | 2.0000000 | 0.0200000 | | 2.0200000 |
| | 80 | 0.0001958 | | | | | | | | | | | 0.0500000 | | 0.0500000 |
| | 800 | 0.0000249 | | | | | | | | | | | | 0.0050000 | 0.0050000 |
| | Total | 0.4551456 | | | | | | | | | | | | | |

*Fig. 10A*

| | | | | | | | | | | | | | | | | |
|---|---|---|---|---|---|---|---|---|---|---|---|---|---|---|---|---|
| | | | Class II | Paytable | | | | | | | | | | | | |
| | | Payout | 1 | 2 | 3 | 4 | 5 | 10 | 15 | 20 | 40 | 50 | 100 | 1,000 | Total | |
| | Payout | Probabilty | 0.0900000 | 0.0700000 | 0.0300000 | 0.0500000 | 0.0100000 | 0.0080000 | 0.0070000 | 0.0060000 | 0.0005000 | 0.0001000 | 0.0001000 | 0.0000200 | 0.2717200 | |
| Class III | 1 | 0.2152592 | 0.1435061 | 0.0717531 | | | | | | | | | | | 0.2152592 | Final Class III |
| Paytable | 2 | 0.1293079 | | 0.0738902 | 0.0369451 | 0.0184726 | | | | | | | | | 0.1293079 | Probability |
| | 3 | 0.0744682 | | | 0.0425533 | 0.0212766 | 0.0106383 | | | | | | | | 0.0744682 | |
| | 4 | 0.0112213 | | | | 0.0074809 | 0.0037404 | | | | | | | | 0.0112213 | |
| | 5 | 0.0108800 | | | | | 0.0098909 | 0.0009891 | | | | | | | 0.0108800 | |
| | 8 | 0.0115143 | | | | | | 0.0089556 | 0.0025587 | | | | | | 0.0115143 | |
| | 25 | 0.0016399 | | | | | | | | | 0.0010249 | 0.0006150 | | | 0.0016399 | |
| | 40 | 0.0005273 | | | | | | | | | 0.0005022 | 0.0000251 | | | 0.0005273 | |
| | 50 | 0.0001068 | | | | | | | | | | 0.0001057 | 0.0000011 | | 0.0001068 | |
| | 80 | 0.0001958 | | | | | | | | | | | 0.0001958 | | 0.0001958 | |
| | 800 | 0.0000249 | | | | | | | | | | | | 0.0000249 | 0.0000249 | |
| | Total | 0.4551456 | | | | | | | | | | | | | | |

Fig. 10B

1020

| | | | Class II | Paytable | | | | | | | | | | | | |
|---|---|---|---|---|---|---|---|---|---|---|---|---|---|---|---|---|
| | | Payout | 1 | 2 | 3 | 4 | 5 | 10 | 15 | 20 | 40 | 50 | 100 | 1,000 | Total | |
| | Payout | Probabilty | 0.0900000 | 0.0700000 | 0.0300000 | 0.0500000 | 0.0100000 | 0.0080000 | 0.0070000 | 0.0060000 | 0.0005000 | 0.0001000 | 0.0001000 | 0.0000200 | 0.2717200 | |
| Class III | 1 | 0.2152592 | 0.1435061 | 0.0717531 | | | | | | | | | | | 0.2152592 | Final Class III |
| Paytable | 2 | 0.1293079 | | 0.0738902 | 0.0369451 | 0.0184726 | | | | | | | | | 0.1293079 | Probability |
| | 3 | 0.0744682 | | | 0.0425533 | 0.0212766 | 0.0106383 | | | | | | | | 0.0744682 | |
| | 4 | 0.0112213 | | | | 0.0074809 | 0.0037404 | | | | | | | | 0.0112213 | |
| | 5 | 0.0108800 | | | | | 0.0098909 | 0.0009891 | | | | | | | 0.0108800 | |
| | 8 | 0.0115143 | | | | | | 0.0089556 | 0.0025587 | 0.0000000 | | | | | 1.0115143 | |
| | 25 | 0.0016399 | | | | | | | | | 0.0010249 | 0.0006150 | | | 0.0016399 | |
| | 40 | 0.0005273 | | | | | | | | | 0.0005022 | 0.0000251 | | | 0.0005273 | |
| | 50 | 0.0001068 | | | | | | | | | | 0.0001057 | 0.0000011 | | 0.0001068 | |
| | 80 | 0.0001958 | | | | | | | | | | | 0.0001958 | | 0.0001958 | |
| | 800 | 0.0000249 | | | | | | | | | | | | 0.0000249 | 0.0000249 | |
| | Total | 0.4551456 | | | | | | | | | | | | | | |

*Fig. 10C*

| | | | Class II | Paytable | | | | | | | | | | | | | |
|---|---|---|---|---|---|---|---|---|---|---|---|---|---|---|---|---|---|
| | | Payout | 1 | 2 | 3 | 4 | 5 | 10 | 15 | 20 | 40 | 50 | 100 | 1,000 | Total | |
| | Payout | Probabilty | 0.0900000 | 0.0700000 | 0.0300000 | 0.0500000 | 0.0100000 | 0.0080000 | 0.0070000 | 0.0060000 | 0.0005000 | 0.0001000 | 0.0001000 | 0.0000200 | 0.2717200 | Ratio of change |
| Class III | 1 | 0.2152592 | 0.0900000 | 0.0344864 | | | | | | | | | | | 0.1244864 | 0.5783094 |
| Paytable | 2 | 0.1293079 | | 0.0355136 | 0.0139418 | 0.0195559 | | | | | | | | | 0.0690114 | 0.5336980 |
| | 3 | 0.0744682 | | | 0.0160582 | 0.0225245 | 0.0043834 | | | | | | | | 0.0429660 | 0.5769711 |
| | 4 | 0.0112213 | | | | 0.0079196 | 0.0015412 | | | | | | | | 0.0094608 | 0.8431110 |
| | 5 | 0.0108800 | | | | | 0.0040754 | 0.0007957 | | | | | | | 0.0048711 | 0.4477112 |
| | 8 | 0.0115143 | | | | | | 0.0072043 | 0.0070000 | 0.0060000 | | | | | 0.0202043 | 1.7547158 |
| | 25 | 0.0016399 | | | | | | | | | 0.0003356 | 0.0000825 | | | 0.0004180 | 0.2549131 |
| | 40 | 0.0005273 | | | | | | | | | 0.0001644 | 0.0000034 | | | 0.0001678 | 0.3182058 |
| | 50 | 0.0001068 | | | | | | | | | | 0.0000142 | 0.0000005 | | 0.0000147 | 0.1377836 |
| | 80 | 0.0001958 | | | | | | | | | | | 0.0000995 | | 0.0000995 | 0.5079819 |
| | 800 | 0.0000249 | | | | | | | | | | | | 0.0000200 | 0.0000200 | 0.8032129 |
| | Total | 0.4551456 | | | | | | | | | | | | | | |

*Fig. 10D*

| | | Class II | Paytable | | | | | | | | | | |
|---|---|---|---|---|---|---|---|---|---|---|---|---|---|
| | Payout | 1 | 2 | 3 | 4 | 5 | 10 | 15 | 20 | 40 | 50 | 100 | 1,000 |
| Class III | 1 | 1.0000000 | 0.4926630 | | | | | | | | | | |
| Paytable | 2 | | 0.5073370 | 0.4647279 | 0.3911187 | | | | | | | | |
| | 3 | | | 0.5352721 | 0.4504892 | 0.4383381 | | | | | | | |
| | 4 | | | | 0.1583921 | 0.1541197 | | | | | | | |
| | 5 | | | | | 0.4075422 | 0.0994595 | | | | | | |
| | 8 | | | | | | 0.9005405 | 1.0000000 | 1.0000000 | | | | |
| | 25 | | | | | | | | | 0.6711536 | 0.8245514 | | |
| | 40 | | | | | | | | | 0.3288464 | 0.0336672 | | |
| | 50 | | | | | | | | | | 0.1417813 | 0.0053715 | |
| | 80 | | | | | | | | | | | 0.9946285 | |
| | 800 | | | | | | | | | | | | 1.0000000 |

*Fig. 10E*

1100

1110 1120 1105 1115

| | | | | | | | | | | | | | | | | |
|---|---|---|---|---|---|---|---|---|---|---|---|---|---|---|---|---|
| | | | Class II | Paytable | | | | | | | | | | | | |
| | | Payout | 1 | 2 | 3 | 4 | 5 | 10 | 15 | 20 | 40 | 50 | 100 | 1,000 | Total | |
| | Payout | Probabilty | 0.0900000 | 0.0700000 | 0.0300000 | 0.0500000 | 0.0100000 | 0.0080000 | 0.0070000 | 0.0060000 | 0.0005000 | 0.0001000 | 0.0001000 | 0.0000200 | 0.2717200 | |
| Class III | 1 | 0.1285088 | 0.0900000 | 0.0400000 | | | | | | | | | | | 0.1300000 | Final Class III |
| Paytable | 2 | 0.0771962 | | 0.0300000 | 0.0300000 | 0.0157050 | | | | | | | | | 0.0757050 | Probability |
| | 3 | 0.0444572 | | | | 0.0342950 | 0.0100000 | 0.0001622 | | | | | | | 0.0444572 | |
| | 4 | 0.0066991 | | | | | | 0.0066991 | | | | | | | 0.0066991 | |
| | 5 | 0.0064953 | | | | | | 0.0011387 | 0.0053700 | | | | | | 0.0065087 | |
| | 8 | 0.0068740 | | | | | | | 0.0016300 | 0.0060000 | | | | | 0.0076300 | |
| | 25 | 0.0009790 | | | | | | | | | 0.0002096 | | | | 0.0002096 | |
| | 40 | 0.0003148 | | | | | | | | | 0.0002904 | 0.0000277 | | | 0.0003181 | |
| | 50 | 0.0000638 | | | | | | | | | | 0.0000723 | | | 0.0000723 | |
| | 80 | 0.0001169 | | | | | | | | | | | 0.0001000 | 0.0000051 | 0.0001051 | |
| | 800 | 0.0000149 | | | | | | | | | | | | 0.0000149 | 0.0000149 | |
| | Total | 0.2717200 | | | | | | | | | | | | | | |

*Fig. 11A*

1100

1125 1130 1105 1115

| | | | | | | | | | | | | | | | |
|---|---|---|---|---|---|---|---|---|---|---|---|---|---|---|---|
| | | | Class II | Paytable | | | | | | | | | | | |
| | | Payout | 1 | 2 | 3 | 4 | 5 | 10 | 15 | 20 | 40 | 50 | 100 | 1,000 | Total |
| | Payout | Probabilty | 0.0900000 | 0.0700000 | 0.0300000 | 0.0500000 | 0.0100000 | 0.0080000 | 0.0070000 | 0.0060000 | 0.0005000 | 0.0001000 | 0.0001000 | 0.0000200 | 0.2717200 |
| Class III | 1 | 0.1285088 | 0.0900000 | **0.0385088** | | | | | | | | | | | **0.1285088** |
| Paytable | 2 | 0.0771962 | | **0.0314912** | 0.0300000 | 0.0157050 | | | | | | | | | **0.0771962** |
| | 3 | 0.0444572 | | | | 0.0342950 | 0.0100000 | 0.0001622 | | | | | | | 0.0444572 |
| | 4 | 0.0066991 | | | | | | 0.0066991 | | | | | | | 0.0066991 |
| | 5 | 0.0064953 | | | | | | 0.0011387 | 0.0053700 | | | | | | 0.0065087 |
| | 8 | 0.0068740 | | | | | | | 0.0016300 | 0.0060000 | | | | | 0.0076300 |
| | 25 | 0.0009790 | | | | | | | | | 0.0002096 | | | | 0.0002096 |
| | 40 | 0.0003148 | | | | | | | | | 0.0002904 | 0.0000277 | | | 0.0003181 |
| | 50 | 0.0000638 | | | | | | | | | | 0.0000723 | | | 0.0000723 |
| | 80 | 0.0001169 | | | | | | | | | | | 0.0001000 | 0.0000051 | 0.0001051 |
| | 800 | 0.0000149 | | | | | | | | | | | | 0.0000149 | 0.0000149 |
| | Total | 0.2717200 | | | | | | | | | | | | | |

*Fig. 11B*

BINGO SYSTEM WITH DISCRETE PAYOUT CATEGORIES

CROSS-REFERENCES TO RELATED APPLICATIONS

This application claims priority to U.S. Provisional Patent Application No. 60/752,014, entitled "BINGO GAMES THAT PROVIDE SIMULATED CLASS III GAME OUTCOMES" and filed on Dec. 19, 2005, which is hereby incorporated by reference.

This application is related to U.S. patent application Ser. No. 11/312,966, entitled "Bingo System with Downloadable Common Patterns" and filed on Dec. 19, 2005, to U.S. patent application Ser. No. 11/402,726, entitled "Using Multiple Bingo Cards to Represent Multiple Slot Paylines and Other Class III Game Options" and filed on Apr. 11, 2006, and to U.S. patent application Ser. No. 11/312,948, entitled "Bingo Gaming Machine Capable of Selecting Different Bingo Pools" and filed on Dec. 19, 2005, which are hereby incorporated by reference.

BACKGROUND OF THE INVENTION

The present disclosure relates to gaming networks and, more particularly, to gaming networks for providing multi-player bingo games.

Gaming in the United States is divided into Class I, Class II and Class III games. Class I gaming includes social games played for minimal prizes, or traditional ceremonial games. Class II gaming includes bingo and bingo-like games. Bingo includes games played for prizes, including monetary prizes, with cards bearing numbers or other designations in which the holder of the cards covers such numbers or designations when objects, similarly numbered or designated, are drawn or electronically determined, and in which the game is won by the first person covering a previously designated arrangement of numbers or designations on such cards. Such an arrangement will sometimes be referred to herein as a "game-winning pattern" or a "game-ending pattern." Class II gaming may also include pull tab games if played in the same location as bingo games, lotto, punch boards, tip jars, instant bingo, and other games similar to bingo. Class III gaming includes any game that is not a Class I or Class II game, such as a game of chance of the kind typically offered in non-Indian, state-regulated casinos.

Two basic forms of bingo exist. In traditional bingo, the players purchase cards after which a draw takes place. The first player to achieve a designated pattern wins. In one type of bingo game known as Bonanza Bingo, the draw for the game takes place before the players know the arrangements on their bingo cards. After the draw occurs, the players may purchase cards and compare the arrangements on the cards to the drawn numbers to determine whether predetermined patterns are matched. Play continues in Bonanza Bingo until at least one of the players matches a designated game-winning pattern. Bonanza Bingo may also encompass bingo variations wherein a partial draw is conducted for some numbers (generally fewer than the number of balls expected to be necessary to win the game) prior to selling the bingo cards. After the bingo cards are sold, additional numbers are drawn until there is a winner.

In a typical bingo game, a "ball drop" display indicates randomly-drawn numbers to be used in playing the bingo game. Accordingly, the term "ball drop" or the like will be used herein to signify the random selection of numbers used in a bingo game; accordingly, the numbers themselves will often be referred to as "balls." Those of skill in the art will realize that the numbers used in an electronic bingo game may be displayed in any convenient fashion and that a simulated "ball drop" is merely one such example. The number of balls drawn and the timing of the ball drops may vary according to the type of bingo game.

As indicated above, a bingo game is played until at least one player covers a predetermined game-winning pattern on the player's bingo card. The game may also include interim winners of prizes based on matching predetermined interim patterns on the bingo card using the same ball draw. The interim pattern wins do not terminate the bingo game. For interim pattern awards, players covering certain interim patterns may receive an additional award as the game continues. Some exceptional bingo versions may allow bingo draws beyond those needed to achieve the bingo game win so as to pay out interim pattern wins at a desired rate. The game-winning awards are generally pari-mutuel in nature. That is, the bingo win award is based upon the total amount wagered on a given occurrence of the bingo game. However, interim pattern awards typically are not pari-mutuel.

Gaming machines such as slot machines and video poker machines have proven to be very popular. However, many games of chance that are played on gaming machines fall into the category of Class III games, which may be subject to stricter approval and regulation. Many gaming establishments have a limited number of gaming machines for playing Class III games and a greater number of gaming machines for playing Class II games, such as bingo.

As such, it would be desirable to provide a gaming system wherein a Class II game may be played on a gaming machine with at least some of the "look and feel" of a Class III game. For example, prior art systems have failed to provide a bingo game on a network of gaming machines that satisfies the regulatory requirements for a Class II game while simulating important aspects of a Class III game.

SUMMARY OF THE INVENTION

Novel methods, devices and systems are described for mapping pay amounts for a variety of Class III game themes to a common set of bingo pay amounts. Each Class III game theme may cause a different type of entertaining display on a gaming machine when bingo is played, based upon a corresponding Class III game. Preferably, each Class III game theme will offer game play and paytable percentages closely matching those of the original Class III game. Some implementations allow flexibility in matching the probabilities of bingo outcomes and Class III game outcomes by mapping ranges of Class III pay amounts to a single bingo pay amount or vice versa. Some implementations provide a system wherein electronic gaming machines presenting entertaining displays of various Class III game themes are linked to a single bingo server.

Some embodiments of the invention provide a gaming machine that includes the following elements: a network interface; a storage medium; a payout device; at least one display device; and at least one logic device. The logic device is configured to perform the following tasks: control a first display of a bingo game according to bingo game information received via the network interface; determine a bingo payout amount for a result of the bingo game; select a Class III payout amount from a global bingo paytable corresponding with a first Class III game and the bingo payout amount; control a second display of a simulated Class III game outcome corresponding with the Class III payout amount; and determine whether there is a difference between the Class III payout amount and the bingo payout amount.

The logic device may be further configured to control the payout device to award the Class III payout amount, plus a bonus equal to the difference between the Class III payout amount and the bingo payout amount, when the logic device determines that there is a difference between the Class III payout amount and the bingo payout amount. The logic device may be further configured to control the payout device to award the Class III payout amount when the logic device determines that there is no difference between the Class III payout amount and the bingo payout amount. In some instances, the bingo payout amount and the Class III payout amount are equal to zero.

The selecting step may involve selecting a Class III payout amount having a first probability that is approximately equal to a second probability of the bingo payout amount. The selecting step may involve searching a data structure stored in the storage medium, the data structure comprising M bingo payout amounts and N Class III payout amounts.

The selecting step may involve selecting one of a plurality of Class III payout amounts corresponding to the bingo payout amount. For example, the storage medium may contains numbers of Class III outcome representations corresponding to a plurality of Class III payout amounts, the numbers being in proportion to the relative probabilities of the Class III payout amounts, and the selecting step may involve randomly selecting one of the Class III outcome representations. The Class III outcome representations may comprise RNG seeds.

Alternatively (or additionally), a weighting function may be applied to select one of the plurality of Class III payout amounts. The weighting function may, for example, apply a weight in proportion to a probability of a Class III payout amount.

The gaming machine may comprise a first display device and a second display device. The bingo game may be displayed on the first display device and a simulated Class III game may be displayed on the second display device.

The logic device may also be configured for receiving an indication that a second Class III game has been selected and mapping payout amounts of the second Class III game to the global bingo paytable. The logic device may be configured for selecting a Class III payment amount from the global bingo paytable according to a bingo payout amount and the second Class III game.

Alternative implementations of the invention provide a method of forming a global bingo payout set. The method includes these steps: establishing B predetermined bingo payout amounts; assigning at least one bingo pattern to each of the B predetermined bingo payout amounts; and mapping each of the B predetermined bingo payout amounts to at least one Class III payout amount of a first Class III game.

The mapping step may involve mapping ranges of Class III payout amounts to corresponding individual bingo payout amounts. Each Class III payout amount in a range may be less than or equal to a corresponding bingo payout amount. A probability of a bingo payout amount is approximately equal to a sum of probabilities of the Class III payout amounts in the corresponding range. The mapping step may involve associating a plurality of Class III payout amounts in a range with the corresponding bingo payout amount such that when a bingo payout amount is awarded in a bingo game, an outcome corresponding to one of the Class III payout amounts in the range will be displayed on a gaming machine.

The mapping step can involve mapping a single Class III payout amount to more than one bingo payout amount. The method may further comprise assigning at least one Class III outcome to each Class III payout amount. The mapping step can include controlling a ratio of a Class III payout amount to a total payout amount. The mapping step may comprise scaling Class III probabilities according to a ratio between a total Class III probability and a total bingo probability. The mapping step may involve assigning a 100% probability that a predetermined bingo payout amount will result in a corresponding Class III payout amount. The mapping step may comprise mapping at least one individual Class III payout amount to an equal bingo payout amount.

The method can include the step of weighting the Class III payout amounts according to their probability in an underlying Class III game. The weighting step may comprise providing relatively more Class III outcomes for Class III payout amounts having relatively higher probabilities. The weighting step can involve applying a relatively higher weighting function to Class III payout amounts that have relatively higher probabilities. The weighting step may comprise approximating Class III win frequencies of the first Class III game, scaled to the a ratio of the total Class II probabilities and the total Class III probabilities. The weighting step can involve assigning a higher priority to matching probabilities of low payouts of the Class III game. The weighting step can involve assigning a higher priority to matching probabilities of high payouts of the Class III game.

The mapping step may involve mapping a plurality of bingo payouts to a Class III payout such that a sum of probabilities of the plurality of bingo payouts approximately equals a probability of the Class III payout. The mapping step may involve controlling D, a difference between a bingo payout amount and a Class III payout amount. For example, the mapping step may comprise minimizing D. The mapping step may involve controlling D to be no more than a predetermined fraction (e.g., ⅓, ½, ⅔ or ¾) of the bingo payout amount. The mapping step can involve controlling Class III payout probabilities to be inversely proportional to D.

The present invention provides hardware (such as gaming machines, network devices and components of such devices) that is configured to perform the methods of the invention, as well as software to control devices to perform these and other methods.

These and other features of the present invention will be presented in more detail in the following detailed description of the invention and the associated figures.

BRIEF DESCRIPTION OF THE DRAWINGS

FIG. 1 is a table that provides an example of applying weights to different outcomes.

FIG. 2 illustrates part of a combined Class II and Class III paytable that provides an example of mapping Class II payouts to Class III payouts.

FIG. 3A is a Class II paytable, the values of which will be used to illustrate several exemplary methods of the invention.

FIG. 3B is a Class III paytable, the values of which will be used to illustrate several exemplary methods of the invention.

FIGS. 5A through 5E are tables that will be used to describe various implementations of method 400.

FIGS. 6A and 6B are tables that will be used to describe alternative implementations of method 400.

FIGS. 10A through 10E are tables that will be used to describe various implementations of method 900.

FIGS. 11A and 11B are tables that will be used to describe alternative methods of the invention.

DETAILED DESCRIPTION OF THE INVENTION

Figure 4:
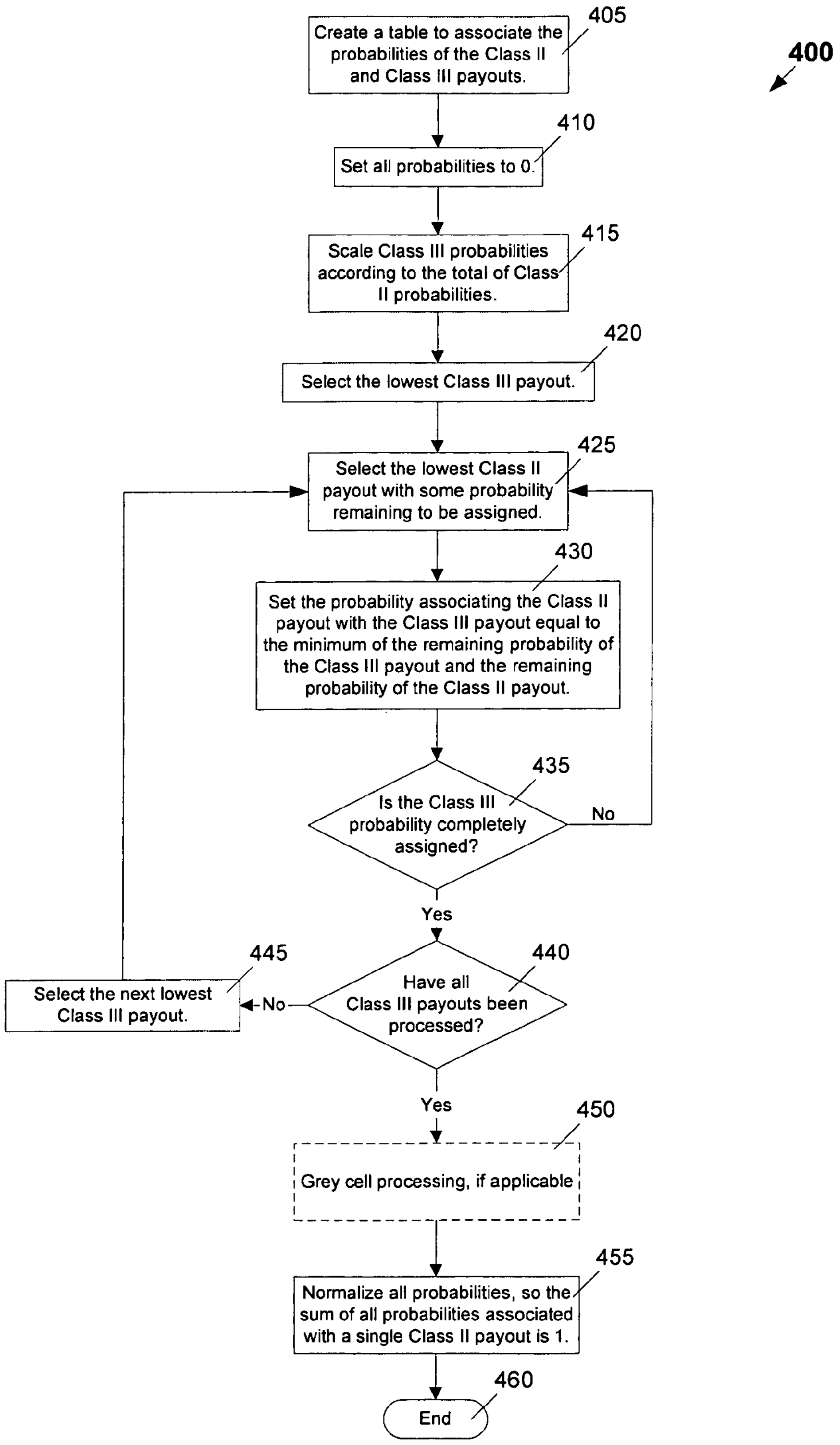
FIG. 4 is a flow chart that will be used to describe various implementations of exemplary method 400 of the invention.

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Overview of Providing Class II Games That Simulate Class III Games

Various methods and devices will be described herein for presenting Class II games (primarily bingo games) with entertaining displays that simulate Class III games. According to some such implementations, bingo players may choose from a variety of Class III game themes, each theme having a different entertaining display adapted from a corresponding Class III game. Preferably, each Class III game theme will offer play and win dynamics and paytable percentages closely matching those of the original Class III game.

The following applications describe pertinent material and are hereby incorporated by reference: U.S. patent application Ser. No. 10/925,710, entitled "Draw Bingo" and filed on Aug. 24, 2004; U.S. patent application Ser. No. 10/937,227, entitled "Bingo Game Morphed to Display Non-Bingo Outcomes" and filed on Sep. 8, 2004; U.S. patent application Ser. No. 11/149,828, entitled "Perrius Poker and Other Bingo Game Variations" and filed on Jun. 10, 2005; This application is related to U.S. patent application Ser. No. 11/312,966, entitled "Bingo System with Downloadable Common Patterns" and filed on Dec. 19, 2005; and U.S. patent application Ser. No. 11/312,948, entitled "Bingo Gaming Machine Capable of Selecting Different Bingo Pools" and filed on Dec. 19, 2005 (the "Bingo Pools Application"), collectively, the "Class II/Class III Applications."

As described in the foregoing applications, providing Class II games that simulate Class III games presents a number of challenges. One of these challenges is to implement such systems while complying with an evolving regulatory framework. It is expected, for example, that Class II regulations will soon require that all gaming machines participating in a single bingo game have the same bingo paytable (the same patterns with the same corresponding probabilities and payouts). This would mean, for example, that if an "X" bingo pattern that pays 10 credits and has a 5% probability of occurring in one game, the pattern must pay 10 credits and have a 5% probability of occurring for all games participating in the same bingo pool.

One approach is to take a Class III paytable, find bingo patterns and probabilities to match the values of the Class III paytable and turn the Class III game into a bingo game. If one were to do this with each Class III paytable individually, one would be turning each Class III game into a separate bingo game.

However, this is not an optimal solution. For example, if a player wants to play a bingo game that simulates Little Green Men®, it is not desirable for the player to play only against other people who are playing Little Green Men® for at least two reasons: (1) there could be a long delay before the game starts, because at least one other person must want to play Little Green Men® at the same time; and (2) the jackpots/bonus awards would tend to be much smaller. It would be preferable to have entertaining displays for many Class III game themes based on one underlying bingo game. This would make it more likely that as soon a player hits "PLAY," the game can start right away because there is someone else out there playing some other game.

Accordingly, another approach (e.g., as described in the Class II/Class III Applications) is to take multiple Class III paytables and merge them into a single paytable. Some probabilities may be averaged in order to obtain the same payout level in each of the games. For example, the probability of hitting a 2-pay in all of the games can be averaged and the averaged probability value can be included in a global paytable for the bingo game. Bingo patterns that have approximately the averaged probability values may be used that for the global bingo paytable.

Although such methods have advantages, they also have various drawbacks. One drawback is that the global paytable may need to be recalculated and re-downloaded each time a new Class III game theme is added. There are other drawbacks, some of which involve the "hit frequency" issues discussed in the following paragraphs.

As described in the Bingo Pools Application, anticipated regulatory requirements introduce further challenges for Class II games that simulate Class III games having a number of player options that will sometimes be referred to herein as "Class III game options" or the like. Class III game options may be, e.g., the number of paylines in a simulated slot game, a number of hands in a simulated video poker game, a number of spots picked for a simulated keno game or a number of wagers placed on a simulated roulette game. However, in part because of the popularity of slot games, the most commonly referenced Class III game options herein are paylines for simulated slot games.

In a typical Class III slot game, the paytable changes based on the number of paylines played. A player playing one line expects all wins to be a multiple of his or her wager. Increasing the number of lines played increases the "hit frequency" but reduces the average payout size. Accordingly, players can play longer but are less likely to have substantial payouts when they do win. For example, a player playing 10 paylines expects some wins that are less than his or her wager (sometimes referred to as "dribble pays" or "cherry dribblers"), but that allow the player to continue playing longer than if only 1 payline were being played. Playing a large number of paylines appeals to players who desire a smooth, low-volatility game that they can play for a relatively long time. On the other hand, playing a small number of paylines appeals to players who prefer a higher-volatility game with less frequent but larger payouts.

In order to comply with the anticipated Class II regulations and more closely match Class III game play, some implementations described in the Bingo Pools Application provide a system wherein separate paytables and bingo pools are formed according to the number of Class III game options. For example, separate paytables and bingo pools may be formed according to the number of paylines played on slot-type game themes and/or the number of hands played on poker game themes. In some such implementations, players will be limited to predetermined numbers of lines (or hands) played, e.g., only 1, 3, 5 or 9 lines. In alternative implementations, a player's options regarding the number of lines played will depend, at least in part, on how many other players are playing any given number of lines on a slot game.

Some preferred implementations of the present invention develop a global bingo paytable and map multiple disparate paytables for Class III game themes (e.g., slot paytables, poker paytables, roulette paytables, etc.), without altering the global bingo paytable. Some such implementations of the invention provide a global bingo paytable with payouts only at predetermined pay levels. The pay levels may, for example, be selected after surveying popular Class III games and determining common pay levels in those games. Such methods do not need exactly to match the distribution of pays for the Class III games, but should provide a reasonable match with the relative probabilities of the Class III game outcomes.

For example, in one exemplary implementation the global bingo paytable may offer payouts of 1, 2, 3, 4, 5, 10, 15, 20, 25, 30, 40, 50, 100, 150, 200, 500 and 1000, even though the Class III game themes may have payouts at other pay levels. Each payout of the global bingo paytable is associated with at least one bingo pattern. Each pattern has a fixed probability. Preferably, each Class III game theme will offer play and win dynamics and paytable percentages closely matching those of the original Class III game.

Some implementations of the invention combine such methods with those described in the Bingo Pools Application. For example, a first global bingo paytable may be used to form a first bingo pool for a first number of Class III game options, a second global bingo paytable may be used to form a second bingo pool for a second number of Class III game options, etc.

Although slot games will be used as an example of mapping multiple disparate paytables of Class III game themes to a bingo paytable, the methods described herein are applicable to other Class III game themes. In this example, each slot paytable is then mapped so that all slot payouts are associated with a bingo payout paying at least as much as the slot payout. In general, the closer the Class II and Class III payouts are, the better.

In some cases, the slot payout will be the same as the bingo payout. For example, a slot payout of 1 may be associated with a bingo payout of 1. When the bingo game hits a payout of 1, the slot game is also assigned a payout of 1. However, in other cases, the slot payout will not necessarily be the same as the bingo payout.

Moreover, there may not always be a one-to-one relationship between bingo payouts and slot payouts. Instead, a single slot payout may correspond with multiple bingo payouts and vice versa. For example, slot payouts of 11, 12, 13 and 15 may be associated with a single bingo payout of, e.g., 15. In this example, when the bingo game hits a payout of 15, the slot game may be assigned a payout of 11, 12, 13 or 15. In other instances, a single slot payout may correspond with multiple bingo payouts. For example, a slot payout of 3 may correspond with bingo payouts of 3, 4 and 5. The difference between the bingo game payout and the slot game payout, if any, is paid as a "bingo bonus" or some other mystery bonus, so that the total amount awarded is equal to the bingo win.

When multiple slot payouts are associated with a single bingo payout (or vice versa), the payouts may (or may not) be weighted so that their frequency of occurrence corresponds to those of the original class III game within predetermined limits and/or criteria. For example, if a single slot payout is associated with more than one bingo payout, various types of weighting techniques may be employed to assign the proper hit frequency to the slot payouts. Various exemplary methods of this kind are discussed below. However, in alternative implementations, where there are N possible outcomes for the same payout, each outcome is simply assigned a probability of 1/N.

Some methods of the invention form a global bingo paytable having deliberate gaps between predetermined bingo pay levels in order to be able to match the distribution of Class III pays for a wide range of Class III games. For example, one exemplary global bingo paytable may have pays of 10 and 20, with no intermediate pays. Any Class III pay that is between 11 and 20 is in the 11-20 group. The bingo card pays 20 and that amount will be awarded for all Class III pays in the 11-20 group. If the Class III pay is less than 20, the difference between 20 and the Class III pay will be awarded as a "bingo win," a "mystery bonus," or the like.

As noted above, the pays in a range can be weighted in order to approximate expected pays and outcomes of the Class III game. Suppose, for example, that the Class III game has pays at 15, 18 and 20, and that the 15-pay is 3 times more likely than the 20-pay in the Class III game. Some implementations of the invention provide 3 times more outcomes that result in a 15-pay, as compared with outcomes that result in a 20-pay. For example, 3 times as many RNG seeds that result in 15-pay outcomes could be provided, as compared to the number of RNG seeds for 20-pay outcomes. Such methods provide the ability to match (or at least to approximate) the relative probabilities of different pays within that group.

Moreover, certain outcomes having the same payout level may be relatively more or less common than others. For example, there may be 4 or 5 different ways to get a 15-pay in the Class III game. Some of these Class III game outcomes may be more probable than others. Therefore, some implementations of the invention weight the more probable outcomes more heavily than the other outcomes of the same pay level. Such weighting could involve assigning more RNG seeds to more probable outcomes. Another method is to assign relative weights to each outcome, making each one more or less likely to be selected on account of the weighting function. The two methods can be combined. U.S. Provisional Patent Application No. 60/709,959, entitled "Multi-Play Poker Gaming System with Predetermined Game Outcomes" and filed Aug. 18, 2005 describes relevant methods, including methods for applying a weighting function to RNG seed selection. This application is hereby incorporated by reference.

Some examples of using a weighting function will now be discussed. In the first example, a player hits a bingo pattern that pays 20. In the list of results that can be sent down to the Class III portion of the game are a variety of RNG seeds. Those RNG seeds can either be weighted or not. If they are weighted, the weights for all of the seeds that are in that group are added. A random-number generator that is the size of the sum is used to pick one of the seeds. A seed that is more likely gets a higher weight than a seed that is less likely. Such methods provide more resolution than simply having relatively more RNG seeds for outcomes that are relatively more likely.

Referring now to FIG. 1, table 100 indicates 4 possible Class III outcomes 105 for the same bingo pay amount. The weight assigned to each Class III outcome is indicated in column 110. The higher the weight, the more likely the corresponding outcome. The total of all the weights is 56. Accordingly, the range assigned to each outcome is equal to the weight, as shown in Draw column 115. In order to determine which outcome will be selected, a random number between 0 and 55 is selected. The outcome is determined according to the range indicated in the "Draw" column 115. For example, if the number 28 were selected, outcome C would be presented.

Referring now to FIG. 2, examples of forming relationships between bingo payouts and Class III game payouts will be described with reference to table 200, which is a portion of a paytable. Bingo payouts are indicated in column 205 and their corresponding probabilities are indicated in column 210. Class III payouts, their weights and probabilities are indicated in columns 215, 220 and 225, respectively.

Table 200 illustrates several options that may be used in forming relationships between bingo payouts and Class III payouts. One such option is that of a one-to-one correspondence between some or all bingo payouts and Class III payouts. In this example, the bingo payouts of 3, 4 and 5 have a one-to-one correspondence with Class III payouts. Accordingly, each of these Class III payouts is assigned a weight of 1.00 and has the same probability as that of the bingo payout.

As will be discussed in more detail below, some implementations of the invention populate an entire table according to one-to-one correspondences between bingo payouts and Class III payouts. However, as table 200 illustrates, the same table that includes one-to-one correspondences may also include instances wherein one bingo payout corresponds with multiple Class III payouts and/or vice versa. Here, the Class III payouts of 6, 7, 8, 9 and 10 all correspond with a bingo payout of 10. Each Class III payout in this range, therefore, is assigned a weight of less than one. The sum of the weights is equal to one. The sum of the Class III probabilities in this range is equal to the corresponding bingo probability.

Similarly, the Class III payouts of 10, 12 and 14 all correspond with a bingo payout of 15. As before, the sum of the weights is equal to one and the sum of the Class III probabilities is equal to the corresponding bingo probability.

Table 200 also illustrates the option of overlapping ranges. In this example, there are 2 possible Class III 10-pays in table 200, one of which is assigned to the 6-10 pay range and another of which is assigned to an overlapping 10-15 pay range.

One issue that arises when mapping Class III payouts to a global bingo paytable is that some Class III games will not have low pays, such as 1-pays or 2-pays. If the Class III payouts from such a game are mapped to a global bingo paytable having lower bingo pays, a total "bingo win" or "mystery bonus" will be a common occurrence. For example, if a Class III game having no 1-pay is mapped to a global bingo paytable having a 1-pay, that 1-pay "bingo win" will not correspond with any win of the Class III game. Therefore, a 100% "bingo win" of 1 credit will be a relatively frequent result. For players focused mainly on the actual bingo game being played, this may not be a detriment. However, for players who are more focused on the entertaining displays of Class III game outcomes, this situation could detract from the illusion of playing a Class III game.

Accordingly, some implementations of the invention provide global bingo paytables wherein the smallest bingo payout is greater than 1. The lowest bingo payout may be set to 2, 3, 4, 5 or an even higher pay amount. For example, in some such global bingo paytables the smallest bingo payout is 5. This bingo payout corresponds to Class III payouts ranging from 1 to 5. When the player attains a bingo pattern corresponding with a payout of 5, the player will be awarded 5 credits. The "mystery bonus" will be the difference, if any, between 5 and the Class III payout. Unless the smallest payout in the Class III game is greater than 5, there will always be a corresponding Class III payout.

Some implementations of the invention provide multiple bingo pools that use different global bingo paytables. In some such implementations, the global bingo paytables may have different minimum pays and/or payout levels. For example, one global bingo paytable might have a minimum pay of 1, another might have a minimum pay of 2 and another might have a minimum pay of 5. In some implementations, Class III games can be sorted according to criteria that include their minimum payout amounts. For example, if it is determined that a slot game has no 1 pay, the slot game would use global bingo paytable having a higher minimum pay (e.g., of 2 or 5).

Examples of Adapting a Class III Paytable to a Global Class II Paytable

Following are several examples of forming relationships between payouts in a global Class II paytable (which will be a global bingo paytable in these examples) and a Class III paytable. These methods may be performed by any of various devices, either by acting alone or in combination with other devices. For example, the underlying computations may be performed by one or more logic devices in a host device, a server, etc. The starting Class II and Class III paytables may be received by such a device according to any method know in the art, e.g., by downloading, via data transfer from a memory device, via data entry, etc. Similarly, the resulting data structures, etc., may be provided to another device (e.g., a server, one or more gaming machines, etc.).

These examples will all refer to Class II paytable 300 illustrated in FIG. 3A and Class III paytable 350 illustrated in FIG. 3B. However, the methods described herein are broadly applicable to mapping various types of Class III paytables to one or more Class II paytables.

Moreover, one or more such methods may be used in combination. In some such implementations, several methods are applied to map the same Class III paytable to a Class II paytable and the best outcome is selected according to a predetermined metric. The metric may be, for example, the lowest average (or lowest maximum) "mystery bonus," the lowest frequency of a "mystery bonus," the best fit to the original Class III paytable, or some combination of one or more of these. In other implementations, a "hybrid" of 2 or more methods may be used. A hybrid method can be formed, for example, by averaging the results from two or more methods, to produce a distinctly new result.

A comparison of Class II paytable 300 and Class III paytable 350 reveals many differences. These differences indicate some of the previously-referenced challenges in providing simulated Class III games based on a global bingo paytable. For example, many of the payouts do not match. There is no 8-pay, 25-pay, 80-pay or 800-pay in Class II payouts 305 corresponding with those of Class III payouts 355. Similarly, there is no 10-pay, 15-pay, 20-pay, 100-pay or 1000-pay in Class III payouts 355 corresponding with those of Class II payouts 305. Moreover, the overall number of payouts in Class II paytable 300 is larger than the number of payouts in Class III paytable 350.

Even for payouts that are common to both paytables, the probabilities do not match. For example, both paytables include a 1-pay, but column 310 indicates that the probability of obtaining a 1-pay in the Class II game is 0.0900000, whereas column 360 indicates that the probability of obtaining a 1-pay in the Class III game is 0.2152592. Moreover, row 320 indicates that the sum of the probabilities for the Class II payouts is 0.2717200, corresponding to a payback percentage 315 of 91%. Row 370 indicates that the sum of the probabilities for the Class III payouts is 0.4551456, corresponding to a payback percentage 365 of 99.169%.

As this example shows, there are sure to be differences between a given Class III paytable and a global Class II paytable. These differences may include differing pay amounts, different probabilities for the same pay amount, a different overall hit frequency and a different overall paytable percentage. The following discussion presents a series of methods for reconciling such differences.

A first such method 400 is outlined in the flow chart FIG. 4. The steps of method 400 are not necessarily performed in the order indicated. For example, step 410 could be performed prior to step 415.

According to method 400, Class III payouts are matched to Class II probabilities from lowest to highest. In alternative implementations, Class III payouts are matched to Class II probabilities from highest to lowest. As described below, these "bottom up" and "top down" approaches may or may not yield very similar results, depending on certain details that will be described below.

In step 405, a table is defined that associates the payouts and probabilities of the Class II paytable and the Class III paytable. One such table is table 500 of FIG. 5A. The Class III paytable comprises payouts 510, probability column 515 and total probability 520. At this stage, the probabilities in probability column 515 are simply the values from column 360 of the Class III paytable illustrated in FIG. 3B. Final Class III probabilities will eventually be indicated in area 540.

Class II paytable 530 includes payouts 525 and probability row 515 and total probability 535. The probabilities in probability row 515 are simply the values from column 310 of the Class II paytable illustrated in FIG. 3A.

White cells 542 indicate where it is possible to associate a Class III win with a Class II win. Grey cells 544 show where it is not possible to associate a Class III win with a Class II win in accordance with the anticipated regulatory scheme. This is so because grey cells 544 indicate situations wherein the Class III win is greater than the Class II win: if we assume that the same bingo pattern must produce the same payout on all participating gaming machines and all Class III game themes, then it would not be permissible for some Class III payouts to be greater than the corresponding Class II payout. However, as discussed in more detail below, some preferred implementations of method 400 involve making interim calculations regarding these grey cells that yield beneficial results.

In step 410, all of the values in the cells 542 and 544 are set to zero. Although different end products are within the scope of the invention, the goal of method 400 is to define a table that determines the Class III payouts associated with each Class II payout and the probability of selecting a corresponding Class III payout, given a specific Class II payout. When a specific Class II win occurs, a Class III win is chosen according to the probabilities defined by the final values in some of cells 542. If the Class III win is less than the corresponding Class II win, the difference between the two is given as a "bingo win," a "mystery bonus" or the like, so that the sum of the Class III win and the bingo win is always equal to the Class II win.

In step 415, the Class III probabilities are scaled so that the total of Class III probabilities 520 equals the total of Class II probabilities 535. This step is illustrated in FIG. 5B. For example, one could let $P_{ii}$ be the total of all Class II probabilities 535 (0.2717200) and let $P_{iii}$ be the total of all Class III probabilities (0.4551456). Then, each Class III can be multiplied by $P_{ii}/P_{iii}$ to attain the values indicated in column 515 of Class III paytable 505. Alternative scaling methods may be used, however.

In method 400, each Class III payout is processed in order from lowest to highest. Broadly speaking, the probability of each Class III payout is assigned to as many of the Class II payouts as necessary, so that the total of all probabilities in the same row as the Class III payout is as close as possible to the Class III probability. In alternative methods, this process is performed from the highest Class III payout to the lowest Class III payout.

Accordingly, in step 420, the lowest Class III payout of one is selected. In step 425, the lowest Class II payout with some probability remaining to be assigned is selected. Here, this is the Class II payout of one.

In step 430, the probability associating the Class II payout of 1 with the Class III payout of 1 is set equal to the minimum of the remaining probability of the Class III payout of 1 and the remaining probability of the Class II payout of 1. The probability 546 for the Class II payout of 1 is 0.09, which is less than that for the Class III payout of 1 (0.1285088). Therefore, the entire probability for the Class II payout of 1 is assigned to area 546.

In step 435, it is determined whether the entire Class III probability has been assigned. Here, there is still some (0.1285088−0.09=0.0385088) of the Class III probability left to be assigned, so the process reverts to step 425. Accordingly, the lowest Class II payout with some probability left to be assigned is determined and selected. (Step 425.) That Class II payout is 2, having a probability of 0.07 (cell 550). The probability associating the Class II payout of 2 with the Class III payout of 1 is then set equal to the minimum of the remaining probability of the Class III payout (0.0385088) and the remaining probability of the Class II payout (0.07). (Step 430). Therefore, the remaining probability of the Class III payout (0.0385088) is inserted in cell 552.

In step 435, it is determined that the Class III probability for the payout of 1 has now been fully assigned. The process continues to step 440, wherein it is determined that all Class III payouts have not yet been processed. Therefore, the lowest Class III payout that has not yet been processed (payout=2) is selected. (Step 445.)

The lowest Class II payout with some probability left to be assigned is then determined and selected. (Step 425.) There is some remaining probability left to be assigned (0.07−0.0385088=0.0314912) for a Class II payout of 2. The probability associating the Class II payout of 2 with the Class III payout of 2 is then set equal to the minimum of the remaining probability of the Class III payout (0.0771962) and the remaining probability of the Class II payout (0.0314912). (Step 430). Therefore, the remaining probability of the Class II payout (0.0314912) is inserted in cell 554.

In step 435, it is again determined that the entire probability for the Class III payout of 2 has not yet been assigned, so the process reverts to step 425. The lowest Class II payout with some probability left to be assigned is then determined to be the payout of 3, which is selected. The probability associating the Class II payout of 3 with the Class III payout of 2 is then set equal to the minimum of the remaining probability of the Class III payout (0.0771962−0.0314912=0.045705) and the remaining probability of the Class II payout (0.03). (Step 430). Therefore, the remaining probability of the Class II payout (0.03) is inserted in cell 556.

It is once again determined that the entire probability for the Class III payout of 2 has not yet been assigned (step 435), so the process reverts to step 425. The lowest Class II payout with some probability left to be assigned is then determined to be the payout of 4, which is selected. The probability associating the Class II payout of 4 with the Class III payout of 2 is then set equal to the minimum of the remaining probability of the Class III payout (0.0771962−(0.0314912+0.03)=0.015705) and the remaining probability of the Class II payout (0.05). (Step 430). Therefore, the remaining probability of the Class III payout (0.015705) is inserted in cell 558.

Method 400 continues until it is determined in step 440 that all Class III payouts have been processed. For "bottom up" implementations of method 400, this determination means that the highest Class III payout (here, 800) has been processed. For "top down" implementations of method 400, this determination means that the lowest Class III payout (here, 1) has been processed. Note that when complete, the total of all probabilities in a single column should add up to the Class II probability and the total of all probabilities in a single row should add up to the Class III probability. The "final" Class III probabilities indicated in area 540 indicate, for example, the sum of all probabilities for the Class III payout of 1 (cell 553) and the sum of all probabilities for the Class III payout of 2 (cell 560).

The process then continues to optional step 450, which involves further processing of values, if any, in area 544. This implementation of method 400 temporarily allocates some probabilities in area 544, where the Class III payout exceeds the Class II payout. For example, cell 545 corresponds to a Class III payout of 25 and a Class II payout of 20. Similarly, cell 555 corresponds to a Class III payout of 80 and a Class II payout of 50. As previously noted, having a Class III payout exceed the payout of the Class II outcome is not a result in compliance with anticipated gaming regulations. Therefore, the final result of any method described herein will not provide a value to be used in area 544.

Accordingly, there are at least 2 general categories of implementations for method 400. In one type of implementation, some probabilities are temporarily allocated for cells in area 544. These probabilities may be dealt with in various ways within the scope of method 400. For example, the value in a cell of area 544 could simply be deleted in step 450. The results of such a method will be described below with reference to FIGS. 5D, 5E and 5F.

Alternatively, in step 450 the value in a cell of area 544 can be added to one or more other probabilities in area 542, e.g., to another cell in the same column that is within area 542. In one such example, the value in cell 545 could be added to the value in cell 561. In another such example, the value in cell 555 could be added to cells 563 and 565 in equal portions, distributed according to the relative probability of each cell, or in another manner. For example, the value in a cell of area 544 could be added to other cells so as to minimize a maximum deviation from the total Class III probability for rows to which the value is added, to minimize an average deviation from such total Class III probabilities, etc. In this example, the value in cell 555 could be added to cells 563 and 565 so as to approximate the desired probabilities for the Class III payouts of 40 and 50 according to some predetermined metric(s).

In implementations of method 400 for which some probabilities are temporarily allocated for cells in area 544, it makes less difference whether a "top down" or a "bottom up" method is used. In other words, whether the method begins with the lowest Class III payout or the highest Class III payout, the resulting probabilities for the cells in area 542 (and the corresponding final Class III probabilities) are similar. Therefore, such implementations are preferred. Still, probabilities corresponding to lower payouts may, at least in some cases, be more similar to those of the underlying Class III game when a "bottom up" technique is used. Probabilities corresponding to higher payouts may be more similar to those of the underlying Class III game when a "top down" technique is used.

However, in other implementations of method 400, interim probabilities are not calculated for cells in area 544. In such implementations, step 450 can be omitted, because no such values will exist. One such implementation will be described below with reference to FIGS. 6A and 6B. In these implementations, the final Class III probabilities will be closer to the desired Class III probabilities for lower payouts when the method begins with the lowest Class III payout. Conversely, the final Class III probabilities will be closer to the desired Class III probabilities for higher payouts when the method begins with the highest Class III payout. These differences will generally be more pronounced than those which arise when using methods wherein some probabilities are temporarily allocated for cells in area 544.

Referring now to FIG. 5D, one exemplary outcome of step 450 will be described. In this simple example, the value formerly in cell 545 has been deleted. Unlike other implementations of method 400, cell 561 has not been modified in step 450. Similarly the value formerly in cell 555 has been deleted. Cells 563 and 565 have not been modified. As a consequence, the final Class III probability for payouts of 25 (cell 573) and of 80 (cell 571) no longer match that of the underlying Class III game.

Moreover, the sum of probabilities in the columns for Class II payouts of 20 and 50 no longer match the corresponding Class II probabilities. For example, the value in cell 561 does not equal that in cell 567. Similarly, the sum of values in cells 563 and 565 does not equal the value in cell 569.

In order to address this issue, in step 455 all probabilities are normalized so that the sum of probabilities in each column equals 1. This result is shown in FIG. 5E. A relatively small data structure that includes only the non-zero portions of the resulting table can be stored for use during play.

Referring now to FIG. 6A, another implementation of method 400 will briefly be described wherein interim probabilities are not calculated for cells in area 644. In such implementations, step 450 can be omitted. In this example, the Class II and Class III probabilities of table 600 are first normalized such that they sum to one.

Turning now to FIG. 6B, the results of a "bottom up" version of one such implementation are indicated in table 600. No interim results are calculated for any cell of area 644. For Class II pays 1 through 15, the results are satisfactory. The sum of the probabilities in each row equals the Class II probability. Even the original and final probabilities for a Class III payout of 8 can be matched using this implementation: the value in cell 601 matches that of cell 602. However, the process begins to produce unsatisfactory results when it reaches cell 605. The available Class II probabilities have been used up, but a comparison of cell 605 and cell 610 reveals that the Class II possibility is not matched. No interim value is calculated for cell 611 to make the column equal to the value in cell 610.

Worse yet, the available Class II probabilities are not sufficient for the method to proceed to any values corresponding to a Class III payout greater than 25 in this example. Cells 615, 620, 625 and 630 receive the corresponding probabilities of Class II payouts 40, 50, 100 and 1000. However, the sum of these probabilities (see cell 635) is still less than the probability of the Class III payout of 25 (see cell 640). Therefore, the method cannot continue beyond cell 630, even though all of the Class III payout levels have not been processed. As a result, in this example there are no Class II payouts that correspond with Class III payouts of 40 or higher.

Figure 7:
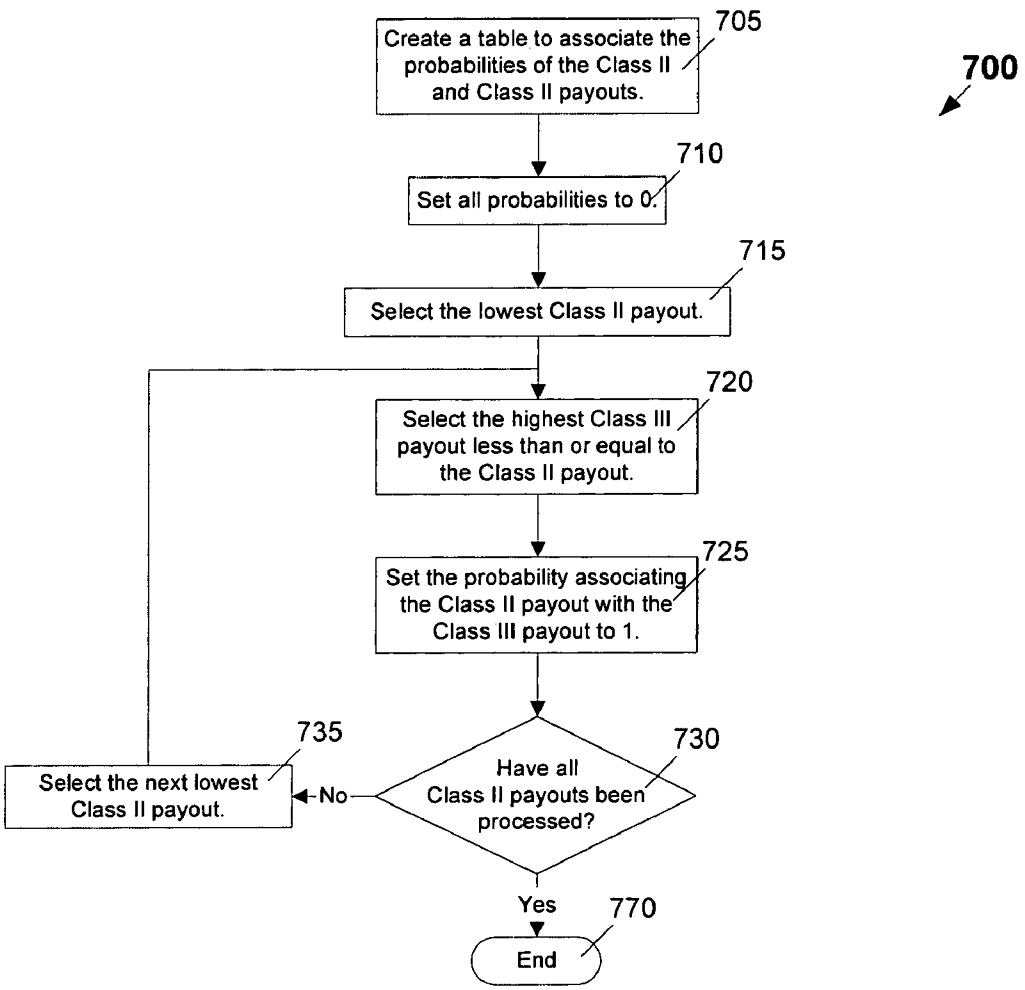
FIG. 7 is a flow chart that will be used to describe various implementations of exemplary method 700 of the invention.
Figure 8:
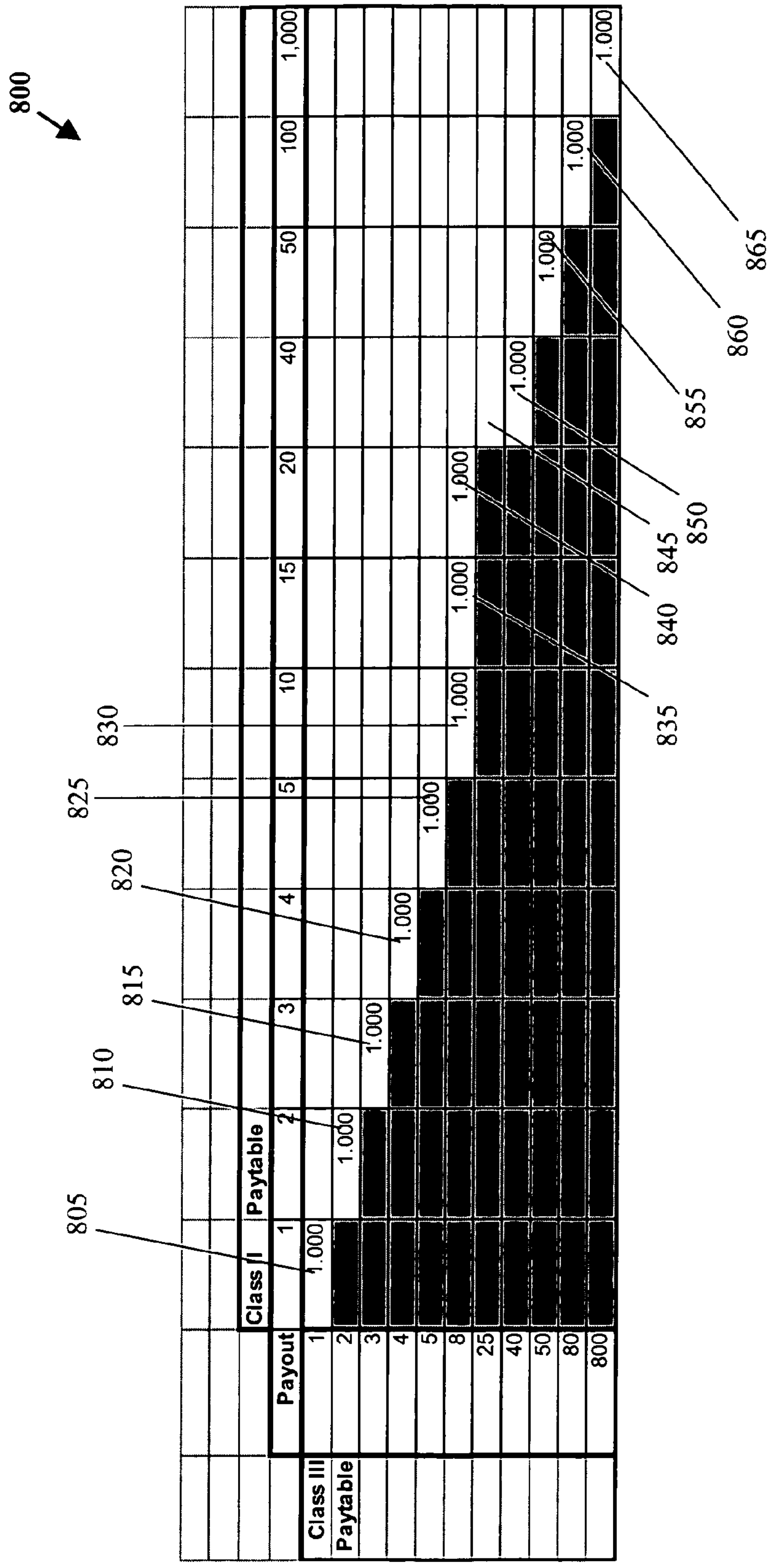
FIG. 8 is a table that will be used to describe various implementations of method 700.

A simpler method 700 for mapping Class II outcomes to Class III outcomes will now be described with reference to the flow chart of FIG. 7 and the table of FIG. 8. Referring first to FIG. 7, method 700 begins when a table is formed that associates probabilities of Class II and Class III payouts. (Step 705.) The values of the Class II and Class III paytables shown in FIGS. 3A and 3B are once again combined into a single table 800, as shown in FIG. 8. In step 810, the probabilities in the table are set to zero.

In step 715, the lowest Class II payout is selected. This is a payout of 1 in the instant case. Accordingly, this implementation of method 700 is a "bottom up" implementation. In alternative implementations, the highest Class II payout is selected and the process operates from the top down. Alternative implementations start with still another payout.

In step 720, the highest Class III payout that is less than or equal to the selected Class II payout is selected. In this example, the only qualifying Class III payout is also a payout of 1. The probability for the Class III payout is then set to 1 and cell 805 is populated accordingly. (Step 725.) This means that when a Class II outcome occurs having a payout of 1, there is a 100% chance that a simulated Class III outcome having a payout of 1 will be presented when the resulting data structure is used during game play. No "mystery bonus" will be required, because the Class II and Class III payout amounts are the same. In the "pure" versions of this method, no effort is made to simulate more closely the hit frequency of the underlying Class III game.

In step 730, it is determined that all Class II payouts have not been processed, so the next-lowest Class II payout is selected. (Step 735.) In successive iterations, cells 810, 815, 820 and 825 are populated with values of 1, indicating that the Class II payouts of 2, 3, 4 and 5 will have a 100% correspondence with the Class III payouts of 2, 3, 4 and 5. Again, because the Class II and Class III payout amounts are the same, no "mystery bonus" will be required.

Cells 830, 835 and 840 are populated in the same way. However, in this instance, a 100% correspondence is made between 3 different Class II payouts (10, 15 and 20) and a single Class III payout (8). "Mystery bonuses" of 2, 7 and 12, respectively, are required to make the total win amount equal the Class II payout amount.

When the Class II payout of 40 is processed, another type of mismatch occurs. In this case, the Class III payout of 40 will be selected in step 720, because it is the highest Class III payout not yet processed that is less than or equal to the Class II payout. Therefore, a 100% correspondence is formed between the Class II payout of 40 and the Class III payout of 40 and cell 850 is populated with a 1. However, cell 845 is skipped. This means that there is no Class II payout that corresponds with a Class III payout of 25.

The remaining Class II payouts of 50, 100 and 1000 are processed in the same fashion in successive iterations of this implementation of method 700. Cells 855, 860 and 865 are populated with ones, as before. After it is determined in step 730 that the highest Class II payout has been processed, the method ends. (Step 740.)

As previously mentioned, "hybrids" of the foregoing methods and their equivalents are within the scope of the present invention. For example, one such hybrid implementation involves a determination as to whether there are Class III payouts that have no corresponding Class II payouts after one of the foregoing methods is completed.

For example, suppose a result such as that indicated by FIG. 6B were obtained, wherein a number of Class III payouts have no corresponding Class II payout. In one such hybrid method, it would be determined that more than a threshold number of Class III payouts have no corresponding Class II payout (e.g., more than 1, more than 2, etc.). In such circumstances, a version of method 700 could be employed to form a 100% correspondence between selected Class II and Class III payouts. Here, for example, the Class II payouts of 50, 100 and 1000 could be mapped to Class III payouts 50, 80 and 800. In some such implementations, each Class III payout will be made to correspond with at least one Class II payout. For example, some of the probability corresponding to Class II outcomes of 40, 50, 100 and/or 1000 is associated with each of the Class III outcomes 25 through 800 according to any of the foregoing methods.

Alternative method 900 of the invention will now be described. According to preferred implementations of this method, the probability for each Class III payout is distributed among all available Class II payouts in inverse proportion to the difference between the Class III and Class II payouts, which will again be referred to as a "mystery bonus" or the like. Some implementations of the method involve controlling the mystery bonus to be less than or equal to a predetermined amount.

Figure 9:
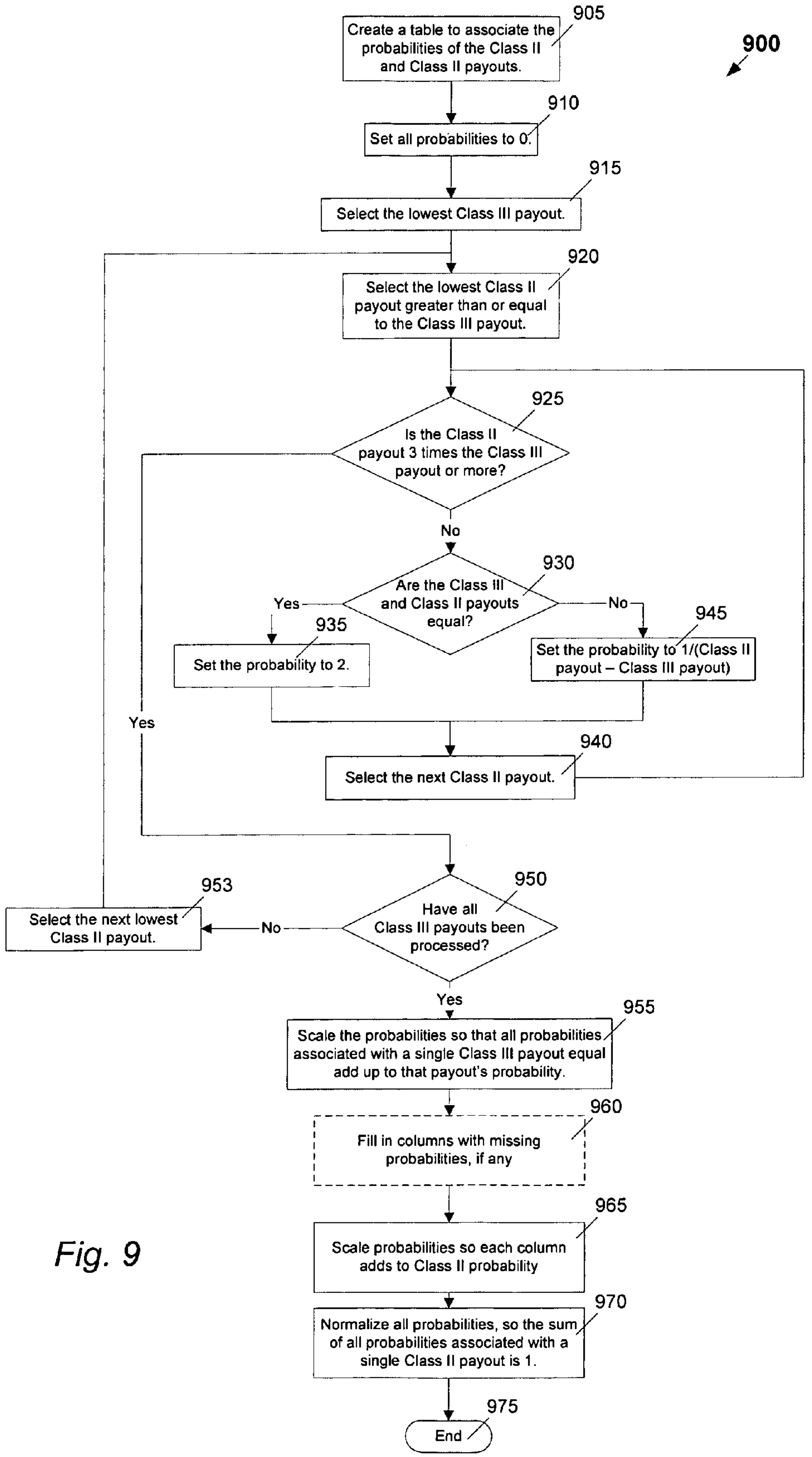
FIG. 9 is a flow chart that will be used to describe various implementations of exemplary method 900 of the invention.

Referring now to FIG. 9, the framework of a table is first created for associating Class II and Class III payouts (step 905). The values from the Class II and Class III paytables of FIGS. 3A and 3B are once again used in this example. The probabilities in the table are initially set to zero. (Step 910.) This example is a "bottom up" method, so the lowest Class III payout (1) is selected first. (Step 915.) In alternative "top down" implementations, the highest Class III payout may be selected first.

In step 920, the lowest Class II payout greater than or equal to the current Class II payout is selected, which is payout of 1 in this instance. In step 925, one or more criteria are applied to control the maximum possible size of the mystery bonus. Various metrics may be used for this purpose, such as controlling the mystery bonus to be less than or equal to a predetermined fraction of the total win. For example, some implementations of this method ensure that the mystery bonus will be no more than ⅓, ½, ⅔ or ¾ of the total Class II payout. Similarly, such implementations of the method may ensure that the Class III is at least a predetermined fraction (e.g., ⅓, ½, ⅔ or ¾) of the total Class II payout, or conversely whether the Class II payout is no more than a predetermined multiple of the Class III payout.

Accordingly, in this example, step 925 involves a determination of whether the Class II payout is 3 times the Class III payout or more. In this example, the answer is "no," so the method proceeds to step 930. At this stage, it is determined whether the Class III and Class II payouts are equal. They are equal, so the method proceeds to step 935.

In step 935, the probability is set to an arbitrarily high value (2 in this example). This places a higher weight on payouts involving no mystery bonus. Cell 1005 of FIG. 10A is populated accordingly.

The next Class II payout is then selected (step 940) and the metric(s) of step 925 are applied once again. The next Class II payout is 2, which is less than 3 times the Class III payout of 1. It is determined in step 930 that the Class II and Class III payouts are not equal, so the probability of the Class II payout is scaled to be lower than the probability corresponding to a situation wherein the payouts are equal. (Step 945.) In this example, the probability is set to be inversely proportional to the difference between the Class II payout and the Class III payout (the inverse of the mystery bonus), which is 1/1=1. Cell 1010 of FIG. 10A is populated accordingly.

The next Class II payout is then selected, which is 3 in this example (step 940). In step 925, it is determined that the Class II payout is 3 times the Class III payout, so no probability is calculated for cell 1015 of FIG. 10.

In step 950, it is determined that all Class III payouts have not yet been processed, so the next lowest Class III payout is selected (step 955). The process continues until it is determined in step 950 that all Class III payouts have been processed. The result in this example is indicated in FIG. 10A. As exemplified by cell 1020, it will sometimes be the case that a Class II payout has no corresponding Class III payout. This will be addressed in a subsequent step of method 900.

Subsequent steps also involve scaling the probabilities, which may be done in various ways and in various sequences. In this example, the probabilities are first scaled so that all probabilities associated with a single Class III payout add up to that payout's probability. (Step 955.) This interim result is shown in FIG. 10B.

In optional step 960, any Class II payouts that have no associated probability are associated with a lower or equal Class III payout. Here, the Class II payout of 20 is associated with a Class III payout of 8. (See cell 1020 of FIG. 10C.)

Next, the probabilities in each column are scaled such that their sum is equal to that of the Class II payout. (Step 965.) The result of this step is indicated in FIG. 10D. Step 965 is performed to determine how closely the final Class III probabilities match the original Class III probabilities; accordingly, this is not an essential step.

The probabilities are then normalized, so that the sum of all probabilities associated with a single Class II payout is 1. (Step 970.) The result is shown in FIG. 10E. The method is then complete. (Step 975.)

Another example of a "hybrid" method will now be described with reference to FIGS. 11A and 11B. This method, which is sometimes referred to herein as a "polishing" method, can be applied to the results of any method of the invention, or results of combinations of such methods. The polishing method evaluates predetermined criteria and fine-tunes the results of other methods.

Some implementations of the polishing method evaluate such results to determine instances wherein two Class III payouts have probabilities in the same Class II column. If two Class III payouts have probabilities in the same Class II column, it is determined a) whether the lower Class III payout probability is higher than desired and b) whether the higher Class III payout is lower than desired. The "desired" probability is generally the Class III probability associated with a particular Class III payout before the foregoing methods are applied (e.g., as depicted in FIG. 3B).

Referring now to table 1100 of FIG. 11A, there are several instances wherein two Class III payouts have probabilities in the same Class II column. One such instance is the column for Class II 2-pays, which includes two Class III payouts. An inspection of cell 1105 reveals that the Class III 1-pay has a final probability (0.13) that is higher than desired: as noted in cell 1110, the desired value is 0.1285088. In addition, cell 1115 indicates that the Class III 2-pay has a final probability (0.0757050) that is too low: the desired value is 0.771962, as set forth in cell 1120.

According to the polishing method, both probabilities can be moved closer to the desired probabilities. Various mathematical operations may be used for the fine-tuning process. In the example shown in FIG. 11B, the results are fine-tuned by subtracting some probability from the lower payout (cell 1125) and adding it to the higher payout (cell 1130) corresponding to the same Class II payout.

The polishing method can improve the table in several ways. First of all, the polishing method reduces the discrepancy in the desired probabilities. Secondly, the polishing method reduces the average "mystery bonus."

There are additional criteria that can trigger the polishing method. For example, it could be invoked when two Class III payouts both have probabilities in the same Class II column, both probabilities are too high and the lower Class III payout probability discrepancy is more than the higher Class III payout probability discrepancy. The polishing method could also be invoked when two Class III payouts both have probabilities in the same Class II column, both probabilities are too low and the lower Class III payout probability discrepancy is less than the higher Class III payout probability discrepancy.

It is desirable to have as many gaming machines as possible participating in the same bingo game. Having a large number of participating gaming machines allows larger jackpots to accumulate and reduces the time that players spend waiting for additional players. Therefore, some implementations provide a system wherein a plurality of electronic gaming machines, each of which is configured for presenting entertaining displays of various Class III game themes, is linked to a single bingo server. By linking many participating electronic gaming machines to a single server, some implementations of the invention allow progressive contributions from all of the participating electronic gaming machines to be pooled into a single progressive jackpot.

Some embodiments of the invention involve gaming machines that are configured with a graphical user interface ("GUI") or the like that allows a player to select a Class III game theme from a plurality of Class III game themes. In some such embodiments, the gaming machine is configured to present any of the proffered Class III game themes.

Alternatively, or additionally, the game theme of a particular networked gaming machine (or a group of networked gaming machines) may be changed according to instructions received from a central system: some gaming networks described herein include a central system that is configured to download game software and data, including but not limited to the underlying bingo patterns, pays and game outcomes, to networked gaming machines. Such gaming networks allow for the convenient provisioning of networked gaming machines.

Moreover, such gaming networks allow additional game themes to be easily and conveniently added, if desired. Related software, including but not limited to game software, may be downloaded to networked gaming machines. Relevant information is set forth in U.S. patent application Ser. No. 11/225,407, by Wolf et al., entitled "METHODS AND DEVICES FOR MANAGING GAMING NETWORKS" and filed Sep. 12, 2005, in U.S. patent application Ser. No. 10/757,609 by Nelson et al., entitled "METHODS AND APPARATUS FOR GAMING DATA DOWNLOADING" and filed on Jan. 14, 2004, in U.S. patent application Ser. No. 10/938,293 by Benbrahim et al., entitled "METHODS AND APPARATUS FOR DATA COMMUNICATION IN A GAMING SYSTEM" and filed on Sep. 10, 2004, in U.S. patent application Ser. No. 11/225,337 by Nguyen et al., filed Sep. 12, 2005 and entitled "DISTRIBUTED GAME SERVICES" and in U.S. patent application Ser. No. 11/173,442 by Kinsley et al., filed Jul. 1, 2005 and entitled "METHODS AND DEVICES FOR DOWNLOADING GAMES OF CHANCE," all of which are hereby incorporated by reference in their entirety and for all purposes. Some exemplary gaming networks and devices are below.

Exemplary System Architecture

Figure 12:
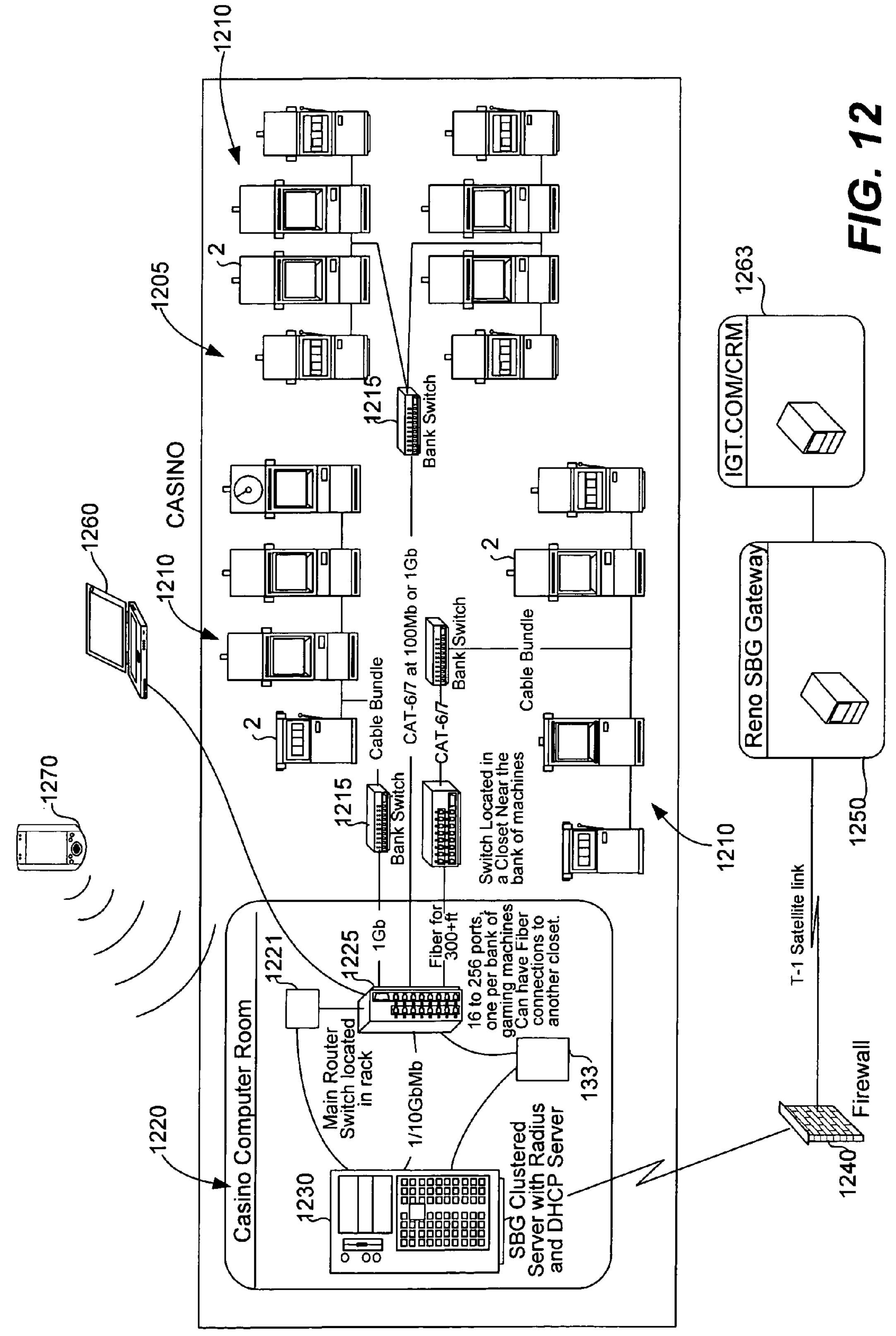
FIG. 12 illustrates one example of a network topology for implementing some aspects of the present invention.

One example of a network topology for implementing some aspects of the present invention is shown in FIG. 12. Those of skill in the art will realize that this exemplary architecture and the related functionality are merely examples and that the present invention encompasses many other such embodiments and methods. Here, for example, a single gaming establishment 1205 is illustrated, which is a casino in this example. However, it should be understood that some implementations of the present invention involve multiple gaming establishments.

Gaming establishment 1205 includes 16 gaming machines 2, each of which is part of a bank 1210 of gaming machines 2. It will be appreciated that many gaming establishments include hundreds or even thousands of gaming machines 2, not all of which are included in a bank 1210. However, the present invention may be implemented in gaming establishments having any number of gaming machines.

Various alternative network topologies can be used to implement different aspects of the invention and/or to accommodate varying numbers of networked devices. For example, gaming establishments with very large numbers of gaming machines 2 may require multiple instances of some network devices (e.g., of main network device 1225, which combines switching and routing functionality in this example) and/or the inclusion of other network devices not shown in FIG. 12. For example, some implementations of the invention include one or more middleware servers disposed between gaming machines 2 and server 1230. Such middleware servers can provide various useful functions, including but not limited to the filtering and/or aggregation of data received from bank switches 1215, from individual gaming machines and from other player terminals. Some implementations of the invention include load balancing methods and devices for managing network traffic.

Each bank 1210 has a corresponding bank switch 1215, which may be a conventional bank switch. Each bank switch is connected to server-based gaming ("SBG") server 1230 via main network device 1225, which combines switching and routing functionality in this example. Although various floor communication protocols may be used, some preferred implementations use IGT's open, Ethernet-based SuperSAS® protocol, which IGT makes available for downloading without charge. However, other protocols such as Best of Breed ("BOB") may be used to implement various aspects of SBG. IGT has also developed a gaming-industry-specific transport layer called CASH that rides on top of TCP/IP and offers additional functionality and security.

SBG server 1230, License Manager 1231, Arbiter 133 and main network device 1225 are disposed within computer room 1220 of gaming establishment 1205. License Manager 1231 may be implemented, at least in part, via a server or a similar device. Some exemplary operations of License Manager 1231 are described in detail in U.S. patent application Ser. No. 11/225,408, entitled "METHODS AND DEVICES FOR AUTHENTICATION AND LICENSING IN A GAMING NETWORK" by Kinsley et al., which is hereby incorporated by reference.

SBG server 1230 can be configured to implement, at least in part, various aspects of the present invention. Some preferred embodiments of SBG server 1230 include (or are at least in communication with) clustered CPUs, redundant storage devices, including backup storage devices, switches, etc. Such storage devices may include a redundant array of inexpensive disks ("RAID"), back-up hard drives and/or tape drives, etc. Preferably, a Radius and a DHCP server are also configured for communication with the gaming network. Some implementations of the invention provide one or more of these servers in the form of blade servers.

In some implementations of the invention, many of these devices (including but not limited to License Manager 1231 and main network device 1225) are mounted in a single rack with SBG server 1230. Accordingly, many or all such devices will sometimes be referenced in the aggregate as an "SBG server." However, in alternative implementations, one or more of these devices is in communication with SBG server 1230 but located elsewhere. For example, some of the devices could be mounted in separate racks within computer room 1220 or located elsewhere on the network. For example, it can be advantageous to store large volumes of data elsewhere via a storage area network ("SAN").

In some embodiments, these components are SBG server 1230 preferably has an uninterruptible power supply ("UPS"). The UPS may be, for example, a rack-mounted UPS module.

Computer room 1220 may include one or more operator consoles or other host devices that are configured for communication with SBG server 1230. Such host devices may be provided with software, hardware and/or firmware for implementing various aspects of the invention; many of these aspects involve controlling SBG server 1230. However, such host devices need not be located within computer room 1220. Wired host device 1260 (which is a laptop computer in this example) and wireless host device (which is a PDA in this example) may be located elsewhere in gaming establishment 1205 or at a remote location.

Arbiter 133 may be implemented, for example, via software that is running on a server or another networked device. Arbiter 133 serves as an intermediary between different devices on the network. Some implementations of Arbiter 133 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 133 is a repository for the configuration information required for communication between devices on the gaming network (and, in some implementations, devices outside the gaming network). Although Arbiter 133 can be implemented in various ways, one exemplary implementation is discussed in the following paragraphs.

Figure 12A:
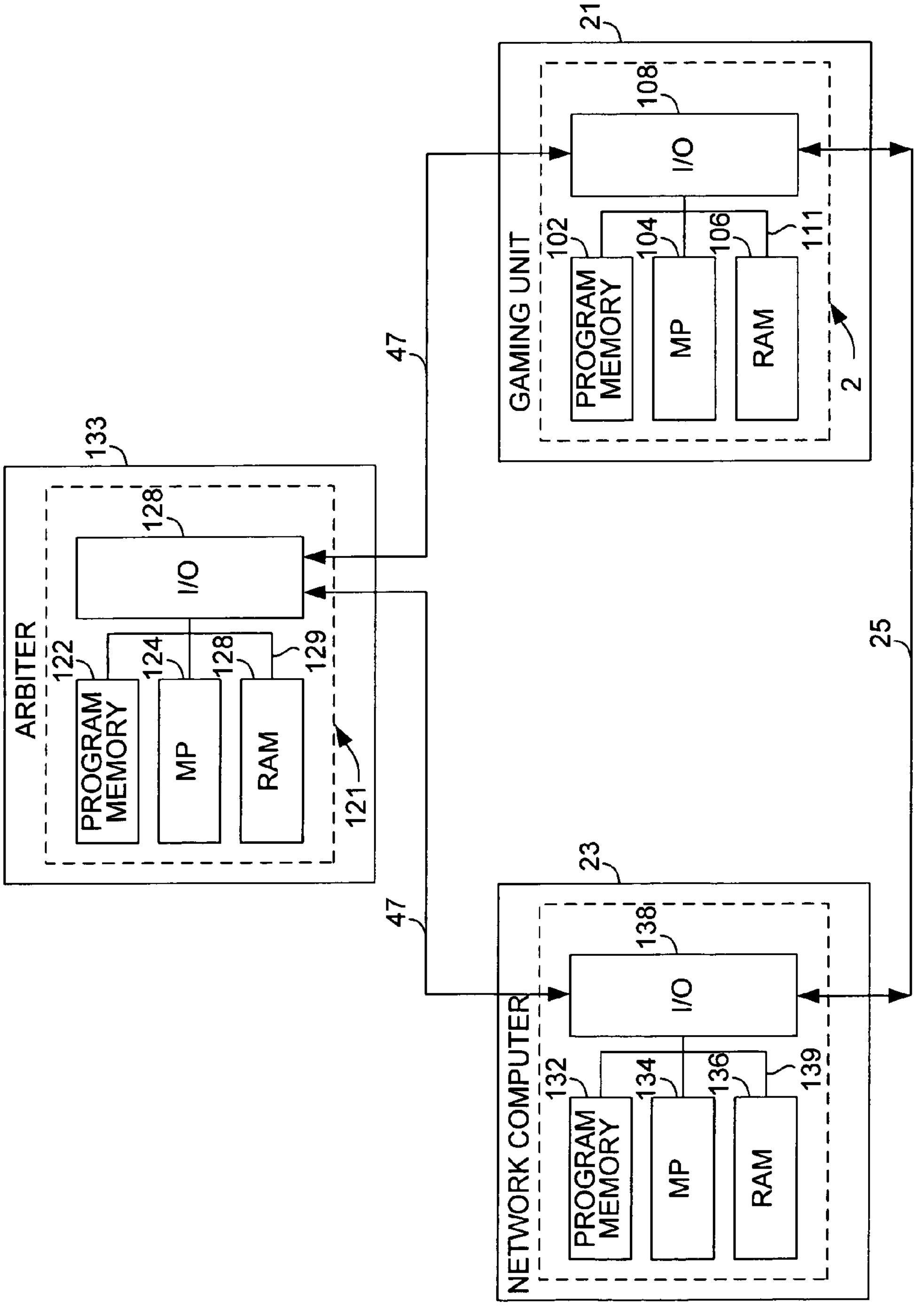
FIG. 12A is a block diagram that illustrates a simplified network topology that illustrates some implementations of an Arbiter.

FIG. 12A is a block diagram of a simplified communication topology between a gaming unit 21, the network computer 23 and the Arbiter 133. Although only one gaming unit 21, one network computer 23 and one Arbiter 133 are shown in FIG. 12A, it should be understood that the following examples may be applicable to different types of network gaming devices within the gaming network 12 beyond the gaming unit 21 and the network computer 23, and may include different numbers of network computers, gaming security arbiters and gaming units. For example, a single Arbiter 133 may be used for secure communications among a plurality of network computers 23 and tens, hundreds or thousands of gaming units 21. Likewise, multiple gaming security arbiters 46 may be utilized for improved performance and other scalability factors.

Referring to FIG. 12A, the Arbiter 133 may include an arbiter controller 121 that may comprise a program memory 122, a microcontroller or microprocessor (MP) 124, a random-access memory (RAM) 126 and an input/output (I/O) circuit 128, all of which may be interconnected via an address/data bus 129. The network computer 23 may also include a controller 131 that may comprise a program memory 132, a microcontroller or microprocessor (MP) 134, a random-access memory (RAM) 136 and an input/output (I/O) circuit 138, all of which may be interconnected via an address/data bus 139. It should be appreciated that although the Arbiter 133 and the network computer 23 are each shown with only one microprocessor 124, 134, the controllers 121, 131 may each include multiple microprocessors 124, 134. Similarly, the memory of the controllers 121, 131 may include multiple RAMs 126, 136 and multiple program memories 122, 132. Although the I/O circuits 128, 138 are each shown as a single block, it should be appreciated that the I/O circuits 128, 138 may include a number of different types of I/O circuits. The RAMs 124, 134 and program memories 122, 132 may be implemented as semiconductor memories, magnetically readable memories, and/or optically readable memories, for example.

Although the program memories 122, 132 are shown in FIG. 12A as read-only memories (ROM) 122, 132, the program memories of the controllers 121, 131 may be a read/write or alterable memory, such as a hard disk. In the event a hard disk is used as a program memory, the address/data buses 129, 139 shown schematically in FIG. 12A may each comprise multiple address/data buses, which may be of different types, and there may be an I/O circuit disposed between the address/data buses.

As shown in FIG. 12A, the gaming unit 21 may be operatively coupled to the network computer 23 via the data link 25. The gaming unit 21 may also be operatively coupled to the Arbiter 133 via the data link 47, and the network computer 23 may likewise be operatively coupled to the Arbiter 133 via the data link 47. Communications between the gaming unit 21 and the network computer 23 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), game download information (e.g., game software and game licensing information) and personal information (e.g., social security number, personal preferences, etc.) may be encrypted with stronger encryption techniques such as DES or 3DES to provide increased security.

As disclosed in further detail in the Arbiter Application, the Arbiter 133 may verify the authenticity of each network gaming device. The Arbiter 133 may receive a request for a communication session from a network device. For ease of explanation, the requesting network device may be referred to as the client, and the requested network device may be referred to as the host. The client may be any device on the network 12 and the request may be for a communication session with any other network device. The client may specify the host, or the gaming security arbiter may select the host based on the request and based on information about the client and potential hosts. The Arbiter 133 may provide encryption keys (session keys) for the communication session to the client via the secure communication channel. Either the host and/or the session key may be provided in response to the request, or may have been previously provided. The client may contact the host to initiate the communication session. The host may then contact the Arbiter 133 to determine the authenticity of the client. The Arbiter 133 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the Arbiter 133 may contact the host regarding the request and provide corresponding session keys to both the client and the host. The Arbiter 133 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

Wireless devices are particularly useful for managing a gaming network. Such wireless devices could include, but are not limited to, laptops, PDAs or even cellular telephones. Referring once again to FIG. 12, one or more network devices in gaming establishment 1205 can be configured as wireless access points. For example, a casino manager may use a wireless handheld device to revise and/or schedule gaming machine configurations while roaming the casino floor. Similarly, a representative of a regulatory body could use a PDA to verify gaming machine configurations, generate reports, view activity logs, etc., while on the casino floor.

If a host device is located in a remote location, security methods and devices (such as firewalls, authentication and/or encryption) should be deployed in order to prevent the unauthorized access of the gaming network. Similarly, any other connection between gaming network 1205 and the outside world should only be made with trusted devices via a secure link, e.g., via a virtual private network ("VPN") tunnel. For example, the illustrated connection between SBG 1230, gateway 1250 and central system 1263 (here, IGT.com) that may be used for game downloads, etc., is advantageously made via a VPN tunnel.

An Internet-based VPN uses the open, distributed infrastructure of the Internet to transmit data between sites. A VPN may emulate a private IP network over public or shared infrastructures. A VPN that supports only IP traffic is called an IP-VPN. VPNs provide advantages to both the service provider and its customers. For its customers, a VPN can extend the IP capabilities of a corporate site to remote offices and/or users with intranet, extranet, and dial-up services. This connectivity may be achieved at a lower cost to the gaming entity with savings in capital equipment, operations, and services. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be obtained from the VPN Consortium, an industry trade group (http://www.vpnc.com, VPNC, Santa Cruz, Calif.).

For security purposes, any information transmitted to or from a gaming establishment over a public network may be encrypted. In one implementation, the information may be symmetrically encrypted using a symmetric encryption key, where the symmetric encryption key is asymmetrically encrypted using a private key. The public key may be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

As mentioned elsewhere herein, U.S. patent application Ser. No. 11/225,408, entitled "METHODS AND DEVICES FOR AUTHENTICATION AND LICENSING IN A GAMING NETWORK" by Kinsley et al., describes novel methods and devices for authentication, game downloading and game license management. This application has been incorporated herein by reference.

Providing a secure connection between the local devices of the SBG system and IGT's central system allows for the deployment of many advantageous features. For example, a customer (e.g., an employee of a gaming establishment) can log onto an account of central system 1263 (in this example, IGT.com) to obtain the account information such as the customer's current and prior account status.

Moreover, such a secure connection may be used by the central system 1263 to collect information regarding a customer's system. Such information includes, but is not limited to, error logs for use in diagnostics and troubleshooting. Some implementations of the invention allow a central system to collect other types of information, e.g., information about the usage of certain types of gaming software, revenue information regarding certain types of games and/or gaming machines, etc. Such information includes, but is not limited to, information regarding the revenue attributable to particular games at specific times of day, days of the week, etc. Such information may be obtained, at least in part, by reference to an accounting system of the gaming network(s), as described in U.S. patent application Ser. No. 11/225,407, by Wolf et al., entitled "METHODS AND DEVICES FOR MANAGING GAMING NETWORKS," which has been incorporated herein by reference.

Automatic updates of a customer's SBG server may also be enabled. For example, central system 1263 may notify a local SBG server regarding new products and/or product updates. For example, central system 1263 may notify a local SBG server regarding updates of new gaming software, gaming software updates, peripheral updates, the status of current gaming software licenses, etc. In some implementations of the invention, central system 1263 may notify a local SBG server (or another device associated with a gaming establishment) that an additional theme-specific data set and/or updates for a previously-downloaded global payout set are available. Alternatively, such updates could be automatically provided to the local SBG server and downloaded to networked gaming machines.

After the local SBG server receives this information, it can identify relevant products of interest. For example, the local SBG server may identify gaming software that is currently in use (or at least licensed) by the relevant gaming entity and send a notification to one or more host devices, e.g., via email. If an update or a new software product is desired, it can be downloaded from the central system. Some relevant downloading methods are described elsewhere herein and in applications that have been incorporated herein by reference, e.g., in U.S. patent application Ser. No. 11/078,966. Similarly, a customer may choose to renew a gaming software license via a secure connection with central system 1263 in response to such a notification.

Secure communication links allow notifications to be sent securely from a local SBG server to host devices outside of a gaming establishment. For example, a local SBG server can be configured to transmit automatically generated email reports, text messages, etc., based on predetermined events that will sometimes be referred to herein as "triggers." Such triggers can include, but are not limited to, the condition of a gaming machine door being open, cash box full, machine not responding, verification failure, etc.

In addition, providing secure connections between different gaming establishments can enable alternative implementations of the invention. For example, a number of gaming establishments, each with a relatively small number of gaming machines, may be owned and/or controlled by the same entity. In such situations, having secure communications between gaming establishments makes it possible for a gaming entity to use a single SBG server as an interface between central system 1263 and the gaming establishments.

Figure 13:
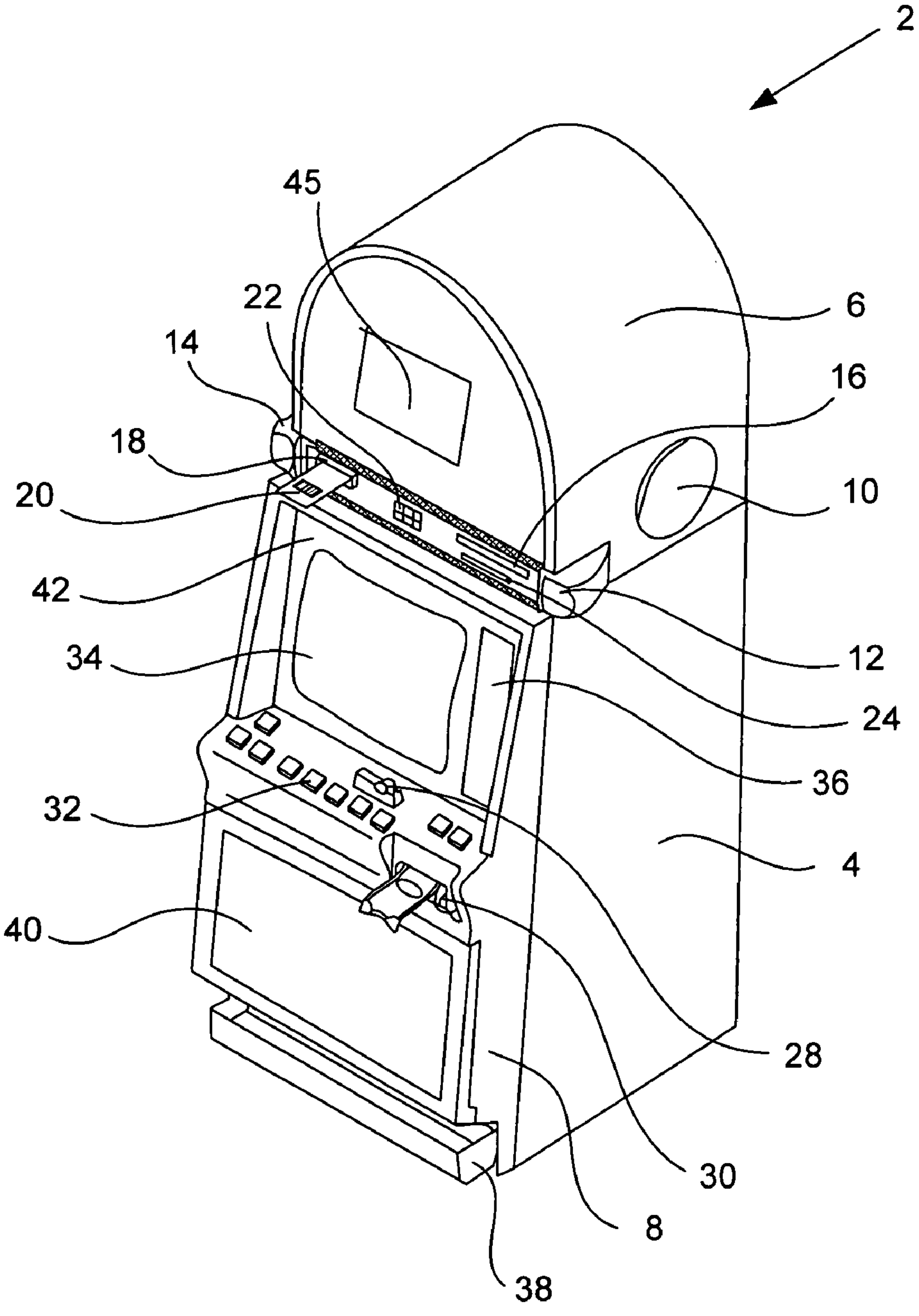
FIG. 13 illustrates a gaming machine that may be configured according to some aspects of the invention.

Turning next to FIG. 13, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in FIG. 13. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 13, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions that affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 14:
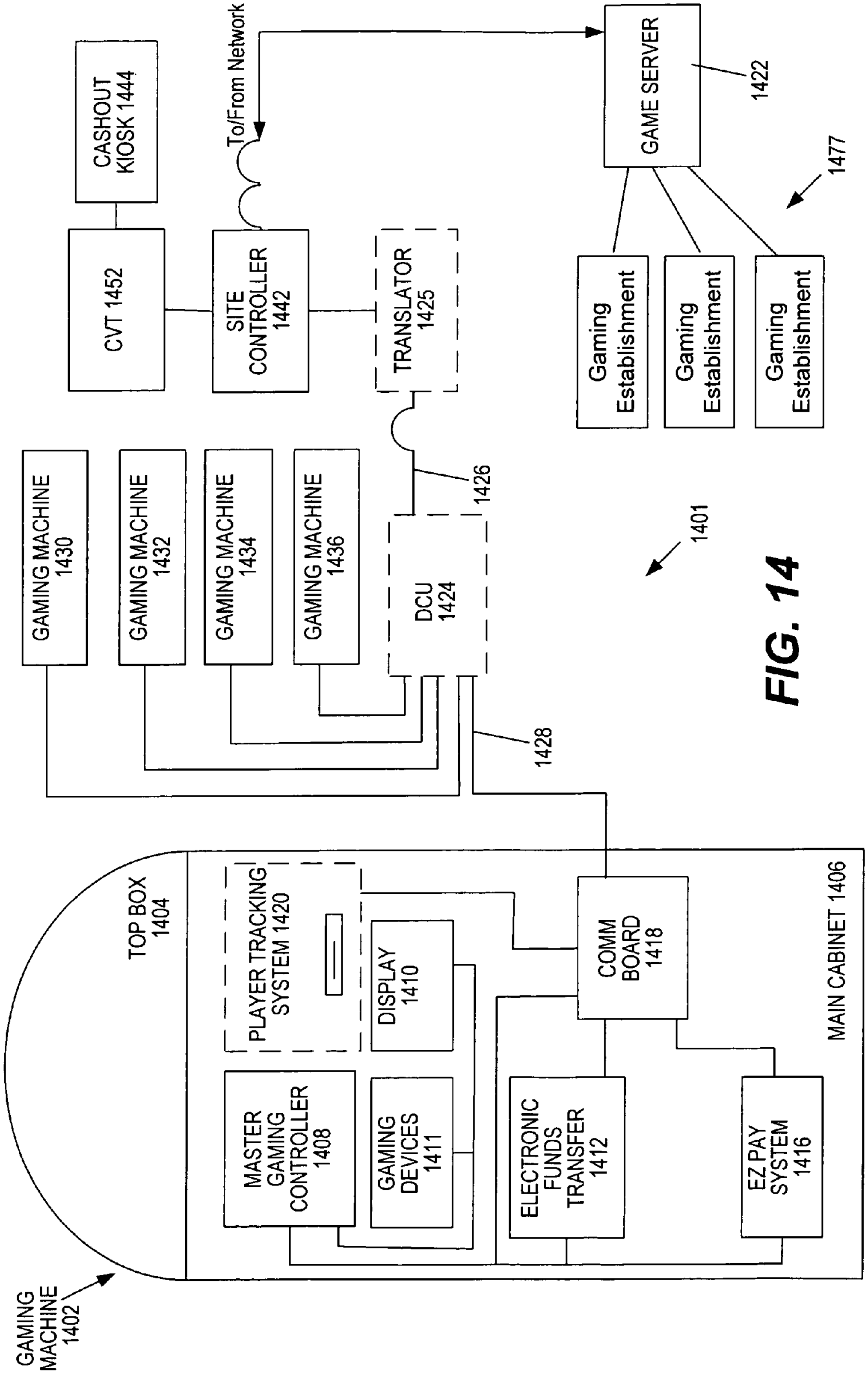
FIG. 14 illustrates a gaming machine and a gaming network that may be configured according to some aspects of the invention.

A gaming network that may be used to implement additional methods performed in accordance with embodiments of the invention is depicted in FIG. 14. Gaming establishment 1401 could be any sort of gaming establishment, such as a casino, a card room, an airport, a store, etc. In this example, gaming network 1477 includes more than one gaming establishment, all of which are networked to game server 1422.

Here, gaming machine 1402, and the other gaming machines 1430, 1432, 1434, and 1436, include a main cabinet 1406 and a top box 1404. The main cabinet 1406 houses the main gaming elements and can also house peripheral systems, such as those that utilize dedicated gaming networks. The top box 1404 may also be used to house these peripheral systems.

The master gaming controller 1408 controls the game play on the gaming machine 1402 according to instructions and/or game data from game server 1422 or stored within gaming machine 1402 and receives or sends data to various input/output devices 1411 on the gaming machine 1402. In one embodiment, master gaming controller 1408 includes processor(s) and other apparatus of the gaming machines described above in FIGS. 6 and 7. The master gaming controller 1408 may also communicate with a display 1410.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 1408 may also communicate with EFT system 1412, EZPAy™ system 1416 (a proprietary cashless ticketing system of the present assignee), and player tracking system 1420. The systems of the gaming machine 1402 communicate the data onto the network 1422 via a communication board 1418.

It will be appreciated by those of skill in the art that embodiments of the present invention could be implemented on a network with more or fewer elements than are depicted in FIG. 14. For example, player tracking system 1420 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Moreover, player tracking information may be combined with other information that is now readily obtainable by an SBG system.

Moreover, DCU 1424 and translator 1425 are not required for all gaming establishments 1401. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machines are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1442 provides this function for gaming establishment 1401. Site controller 1442 is connected to a central system and/or other gaming establishments via one or more networks, which may be public or private networks. Among other things, site controller 1442 communicates with game server 1422 to obtain game data, such as ball drop data, bingo card data, etc.

In the present illustration, gaming machines 1402, 1430, 1432, 1434 and 1436 are connected to a dedicated gaming network 1422. In general, the DCU 1424 functions as an intermediary between the different gaming machines on the network 1422 and the site controller 1442. In general, the DCU 1424 receives data transmitted from the gaming machines and sends the data to the site controller 1442 over a transmission path 1426. In some instances, when the hardware interface used by the gaming machine is not compatible with site controller 1442, a translator 1425 may be used to convert serial data from the DCU 1424 to a format accepted by site controller 1442. The translator may provide this conversion service to a plurality of DCUs.

Further, in some dedicated gaming networks, the DCU 1424 can receive data transmitted from site controller 1442 for communication to the gaming machines on the gaming network. The received data may be, for example, communicated synchronously to the gaming machines on the gaming network.

Here, CVT 1452 provides cashless and cashout gaming services to the gaming machines in gaming establishment 1401. Broadly speaking, CVT 1452 authorizes and validates cashless gaming machine instruments (also referred to herein as "tickets" or "vouchers"), including but not limited to tickets for causing a gaming machine to display a game result and cash-out tickets. Moreover, CVT 1452 authorizes the exchange of a cashout ticket for cash. These processes will be described in detail below. In one example, when a player attempts to redeem a cash-out ticket for cash at cashout kiosk 1444, cash out kiosk 1444 reads validation data from the cashout ticket and transmits the validation data to CVT 1452 for validation. The tickets may be printed by gaming machines, by cashout kiosk 1444, by a stand-alone printer, by CVT 1452, etc. Some gaming establishments will not have a cashout kiosk 1444. Instead, a cashout ticket could be redeemed for cash by a cashier (e.g. of a convenience store), by a gaming machine or by a specially configured CVT.

Figure 15:
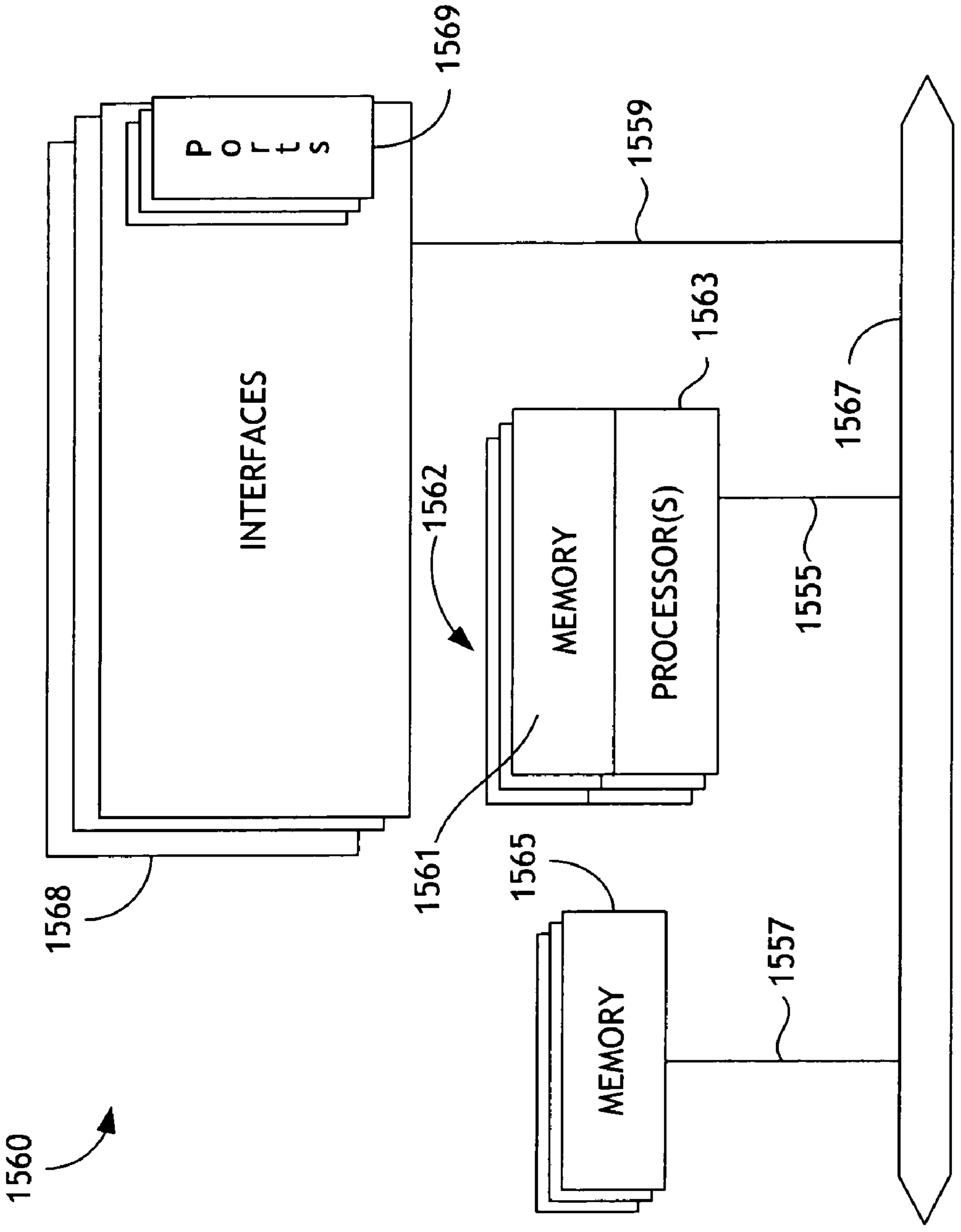
FIG. 15 illustrates a network device that may be configured according to some aspects of the invention.

FIG. 15 illustrates an example of a network device that may be configured for implementing some methods of the present invention. Network device 1560 includes a master central processing unit (CPU) 1562, interfaces 1568, and a bus 1567 (e.g., a PCI bus). Generally, interfaces 1568 include ports 1569 appropriate for communication with the appropriate media. In some embodiments, one or more of interfaces 1568 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1568 control such communications-intensive tasks as encryption, decryption, compression, decompression, packetization, media control and management. By providing separate processors for the communications-intensive tasks, interfaces 1568 allow the master microprocessor 1562 efficiently to perform other functions such as routing computations, network diagnostics, security functions, etc.

The interfaces 1568 are typically provided as interface cards (sometimes referred to as "linecards"). Generally, interfaces 1568 control the sending and receiving of data packets over the network and sometimes support other peripherals used with the network device 1560. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1562 may be responsible for implementing specific functions associated with the functions of a desired network device. According to some embodiments, CPU 1562 accomplishes all these functions under the control of software including an operating system and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

Regardless of the network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 15 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 15) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

We claim:

1. A gaming machine, comprising:

a network interface;

a storage medium;

a payout device;

at least one display device; and at least one logic device configured to perform the following tasks:

control a first display of a bingo game according to bingo game information received via the network interface;

determine a bingo payout amount for a result of the bingo game;

select, from a global bingo paytable, a selected Class III payout amount from a plurality of Class III payout amounts corresponding with a first Class III game theme and the bingo payout amount, wherein each Class III payout amount in the plurality of Class III payout amounts corresponding with the first Class III game theme and the bingo payout amount is weighted in proportion to a probability of the Class III payout amount and the selected Class III payout amount is selected based on the weights, wherein the global bingo paytable includes Class III payout amounts and corresponding Class III game outcomes from a plurality of different Class III game themes including the first Class III game theme, wherein the Class III payout amounts correspond to payout amounts of the Class III game themes, and wherein the Class III game outcomes correspond to game outcomes of the Class III game themes;

control a second display of a simulated Class III game outcome based on a Class III game outcome corresponding with the selected Class III payout amount; and determine whether there is a difference between the selected Class III payout amount and the bingo payout amount.

2. The gaming machine of claim 1, wherein, when the at least one logic device determines that there is a difference between the selected Class III payout amount and the bingo payout amount, the at least one logic device is further configured to control the payout device to award the selected Class III payout amount plus a bonus equal to the difference between the selected Class III payout amount and the bingo payout amount.

3. The gaming machine of claim 1, wherein, when the at least one logic device determines that there is no difference between the selected Class III payout amount and the bingo payout amount, the at least one logic device is further configured to control the payout device to award the selected Class III payout amount.

4. The gaming machine of claim 1, wherein the at least one logic device is configured to select the selected Class III payout amount by searching a data structure stored in the storage medium, the data structure comprising M bingo payout amounts and N Class III payout amounts.

5. The gaming machine of claim 1, wherein the bingo payout amount and the selected Class III payout amount are equal to zero.

6. The gaming machine of claim 1, wherein the gaming machine comprises a first display device and a second display device, wherein the bingo game is displayed on the first display device and wherein the simulated Class III game outcome is displayed on the second display device.

7. The gaming machine of claim 1, wherein the one or more logic devices are further configured to:

receive an indication that a second Class III game theme has been selected; and map payout amounts of the second Class III game theme to the global bingo paytable.

8. The gaming machine of claim 1, wherein the storage medium contains numbers of Class III outcome representations corresponding to a plurality of Class III payout amounts, the numbers being in proportion to the relative probabilities of the Class III payout amounts, and wherein the selecting step comprises randomly selecting one of the Class III outcome representations.

9. The gaming machine of claim 7, wherein a logic device is configured for selecting a Class III payment amount from the global bingo paytable according to a bingo payout amount and the second Class III game theme.

10. The gaming machine of claim 8, wherein the Class III outcome representations comprise RNG seeds.

11. The gaming machine of claim 1, wherein the first Class III game theme corresponds with a Class III game theme of an actual Class III game.

12. Software embodied in at least one non-transitory, machine-readable medium, the software including instructions for controlling a gaming machine to:

control a first display of a bingo game according to bingo game information received via a network interface;

determine a bingo payout amount for a result of the bingo game;

select, from a global bingo paytable, a selected Class III payout amount from a plurality of Class III payout amounts corresponding with a first Class III game theme and the bingo payout amount, wherein each Class III payout amount in the plurality of Class III payout amounts corresponding with the first Class III game theme and the bingo payout amount is weighted in proportion to a probability of the Class III payout amount and the selected Class III payout amount is selected based on the weights, wherein the global bingo paytable includes Class III payout amounts and corresponding Class III game outcomes from a plurality of different Class III game themes including the first Class III game theme, wherein the Class III payout amounts correspond to payout amounts of the Class III game themes, and wherein the Class III game outcomes correspond to game outcomes of the Class III game themes;

control a second display of a simulated Class III game outcome based on a Class III game outcome corresponding with the selected Class III payout amount; and determine whether there is a difference between the selected Class III payout amount and the bingo payout amount.

13. The software embodied in the at least one non-transitory, machine-readable medium of claim 12, wherein the software further comprises instructions for controlling a payout device to award the selected Class III payout amount plus a bonus equal to the difference between the selected Class III payout amount and the bingo payout amount when it is determined that there is a difference between the selected Class III payout amount and the bingo payout amount.

14. The software embodied in the at least one non-transitory, machine-readable medium of claim 12, wherein the software further comprises instructions for controlling a payout device, when it is determined that there is no difference between the selected Class III payout amount and the bingo payout amount, to award the selected Class III payout amount.

15. The software embodied in the at least one non-transitory, machine-readable medium of claim 12, wherein the instructions for controlling the gaming machine to select the selected Class III payout amount control the gaming machine to select the selected Class III payout amount by searching a data structure stored in the storage medium, the data structure comprising M bingo payout amounts and N Class III payout amounts.

16. The software embodied in the at least one non-transitory, machine-readable medium of claim 12, wherein the bingo payout amount and the selected Class III payout amount are equal to zero.

17. The software embodied in the at least one non-transitory, machine-readable medium of claim 12, wherein the gaming machine comprises a first display device and a second display device, wherein software further includes instructions for controlling the gaming machine to display the bingo game on the first display device and the simulated Class III game outcome on the second display device.

18. The software embodied in the at least one non-transitory, machine-readable medium of claim 12, wherein the software includes further instructions for controlling the gaming machine to:

receive an indication that a second Class III game theme has been selected; and map payout amounts of the second Class III game theme to the global bingo paytable.

19. The software embodied in the at least one non-transitory, machine-readable medium of claim 18, wherein the software includes further instructions for controlling the gaming machine to select a Class III payment amount from the global bingo paytable according to a bingo payout amount and the second Class III game theme.

20. The software embodied in the at least one non-transitory, machine-readable medium of claim 12, wherein the first Class III game theme corresponds with a Class III game theme of an actual Class III game.

* * * * *